US012164261B2

(12) United States Patent
Wang et al.

(10) Patent No.: US 12,164,261 B2
(45) Date of Patent: Dec. 10, 2024

(54) DRUM CARTRIDGE INCLUDING DRUM CONTACT MOVABLE IN ACCORDANCE WITH ATTACHMENT OF DRUM CARTRIDGE TO MAIN FRAME

(71) Applicant: BROTHER KOGYO KABUSHIKI KAISHA, Nagoya (JP)

(72) Inventors: Yuwen Wang, Nagoya (JP); Junichi Hashimoto, Toyohashi (JP); Takuya Amaike, Iwakura (JP); Masayoshi Mita, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/322,698

(22) Filed: May 24, 2023

(65) Prior Publication Data

US 2023/0297022 A1 Sep. 21, 2023

Related U.S. Application Data

(63) Continuation of application No. PCT/JP2021/042565, filed on Nov. 19, 2021.

(30) Foreign Application Priority Data

Nov. 30, 2020 (JP) ................................ 2020-198512
Nov. 30, 2020 (JP) ................................ 2020-198513

(51) Int. Cl.
*G03G 15/08* (2006.01)
*G03G 21/18* (2006.01)

(52) U.S. Cl.
CPC ..... *G03G 21/1814* (2013.01); *G03G 15/0886* (2013.01); *G03G 21/1842* (2013.01);
(Continued)

(58) Field of Classification Search
CPC .......... G03G 15/08631; G03G 15/087; G03G 15/0886; G03G 21/1652; G03G 21/1814;
(Continued)

(56) References Cited

U.S. PATENT DOCUMENTS

2011/0217068 A1 9/2011 Kamimura et al.
2013/0223869 A1 8/2013 Oda
(Continued)

FOREIGN PATENT DOCUMENTS

JP 2019-159048 A 9/2010
JP 2011-186067 A 9/2011
(Continued)

OTHER PUBLICATIONS

International Search Report issued in PCT/JP2021/042565, Jan. 19, 2022.
(Continued)

*Primary Examiner* — Sophia S Chen
(74) *Attorney, Agent, or Firm* — Merchant & Gould P.C.

(57) ABSTRACT

A drum cartridge attachable to and detachable from a main frame of an image forming apparatus includes: a photosensitive drum; a drum frame; and a drum contact. The photosensitive drum is rotatable about a drum axis extending in a first direction. A toner cartridge including a storage medium having an electrical contact surface is attachable to and detachable from the drum frame. In a state where the toner cartridge is attached to the drum frame, the drum contact is movable in the first direction between: a separated position in which the drum contact is positioned away from the electrical contact surface; and a contacting position in which the drum contact is in contact with the electrical contact surface. The drum contact moves from the separated position to the contacting position in accordance with attachment of the drum cartridge to the main frame.

17 Claims, 22 Drawing Sheets

(52) U.S. Cl.
CPC . *G03G 21/1867* (2013.01); *G03G 2215/0692* (2013.01); *G03G 2221/1869* (2013.01)

(58) Field of Classification Search
CPC .......... G03G 21/1842; G03G 21/1867; G03G 2215/0692; G03G 2221/1684; G03G 2221/1823; G03G 2221/1869
See application file for complete search history.

(56) References Cited

U.S. PATENT DOCUMENTS

| | | | | |
|---|---|---|---|---|
| 2015/0124286 | A1 | 5/2015 | Kim | |
| 2018/0136600 | A1 | 5/2018 | Morishita et al. | |
| 2019/0196394 | A1 | 6/2019 | Yubuki et al. | |
| 2019/0278221 | A1 | 9/2019 | Saeki | |
| 2020/0249616 | A1* | 8/2020 | Ishii | G03G 21/1652 |
| 2022/0026846 | A1* | 1/2022 | Abe | G03G 21/1814 |

FOREIGN PATENT DOCUMENTS

| | | | |
|---|---|---|---|
| JP | 2020-160273 | A | 9/2013 |
| JP | 2015-069126 | A | 4/2015 |
| JP | 2017-191331 | A | 10/2017 |
| JP | 2019-117346 | A | 7/2019 |
| JP | 2020-38240 | A | 3/2020 |
| JP | 2020-52333 | A | 4/2020 |
| JP | 2013-174723 | A | 10/2020 |
| WO | 2017/081905 | A1 | 5/2017 |

OTHER PUBLICATIONS

International Preliminary Report on Patentability issued in corresponding application PCT/JP2021/042565 on May 30, 2023.

* cited by examiner

DRUM CARTRIDGE INCLUDING DRUM CONTACT MOVABLE IN ACCORDANCE WITH ATTACHMENT OF DRUM CARTRIDGE TO MAIN FRAME

REFERENCE TO RELATED APPLICATIONS

This is a by-pass continuation application of International Application No. PCT/JP2021/042565 filed Nov. 19, 2021 which claims priorities from Japanese Patent Application No. 2020-198512 filed Nov. 30, 2020 and Japanese Patent Application No. 2020-198513 filed Nov. 30, 2020. The entire contents of the International Application and the priority applications are incorporated herein by reference.

BACKGROUND ART

An electro-photographic type image forming apparatus such as a laser printer and an LED printer is known in the art. The image forming apparatus includes a toner cartridge, and a drum cartridge. The toner cartridge is attachable to a drum frame of the drum cartridge. Further, the drum cartridge to which the toner cartridge is attached is attachable to a main frame of the image forming apparatus.

DESCRIPTION

In such a conventional image forming apparatus, there is a case in which the toner cartridge includes a storage medium having an electric contact surface, and the drum cartridge includes a contact that can contact the electric contact surface of the storage medium of the toner cartridge. In such a case, the contact of the drum cartridge needs to contact the electrical contact surface of the storage medium of the toner cartridge. However, it is desired that frictional wearing between the electrical contact surface of the storage medium of the toner cartridge and the contact of the drum cartridge is restrained when the toner cartridge is attached to the drum frame of the drum cartridge.

In view of the foregoing, it is an object of the present disclosure to provide a drum cartridge in which frictional wearing between an electrical contact surface of a storage medium of a toner cartridge and a drum contact of the drum cartridge can be restrained when the toner cartridge is attached to a drum frame of the drum cartridge.

In order to attain the above and other object, the present disclosure provides a drum cartridge attachable to and detachable from a main frame of an image forming apparatus. The drum cartridge includes: a photosensitive drum; a drum frame; and a drum contact. The photosensitive drum is rotatable about a drum axis extending in a first direction. The drum frame includes a first side frame positioned at one end portion in the first direction of the photosensitive drum and a second side frame positioned at another end portion in the first direction of the photosensitive drum. A toner cartridge including a storage medium having an electrical contact surface is attachable to and detachable from the drum frame. The drum contact is positioned at the second side frame. In a state where the toner cartridge is attached to the drum frame, the drum contact is movable in the first direction between: a separated position in which the drum contact is positioned away the electrical contact surface; and a contacting position in which the drum contact is in contact with the electrical contact surface. The drum contact moves from the separated position to the contacting position in accordance with attachment of the drum cartridge to the main frame.

In the above structure, the drum contact moves from the separated position to the contacting position in accordance with an attachment operation of the drum cartridge to the main frame. Accordingly, frictional wearing between the electrical contact surface and the drum contact can be restrained when the toner cartridge is attached to the drum frame of the drum cartridge.

Hereinafter, one embodiment of the present disclosure will be described while referring to the accompanying drawings.

In the following description, a direction in which agitators 20 of toner cartridges 2 extend will be referred to as "first direction", a direction in which a plurality of photosensitive drums 70 are arranged in a drum cartridge 3 will be referred to as "second direction", and a direction in which the toner cartridges 2 are inserted into the drum cartridge 3 will be referred to as "third direction". The first direction and the second direction cross each other, and preferably, are orthogonal to each other. The second direction and the third direction cross each other, and preferably, are orthogonal to each other. The third direction and the first direction cross each other, and preferably, are orthogonal to each other.

<1. Configuration of Image Forming Apparatus>

Figure 1:
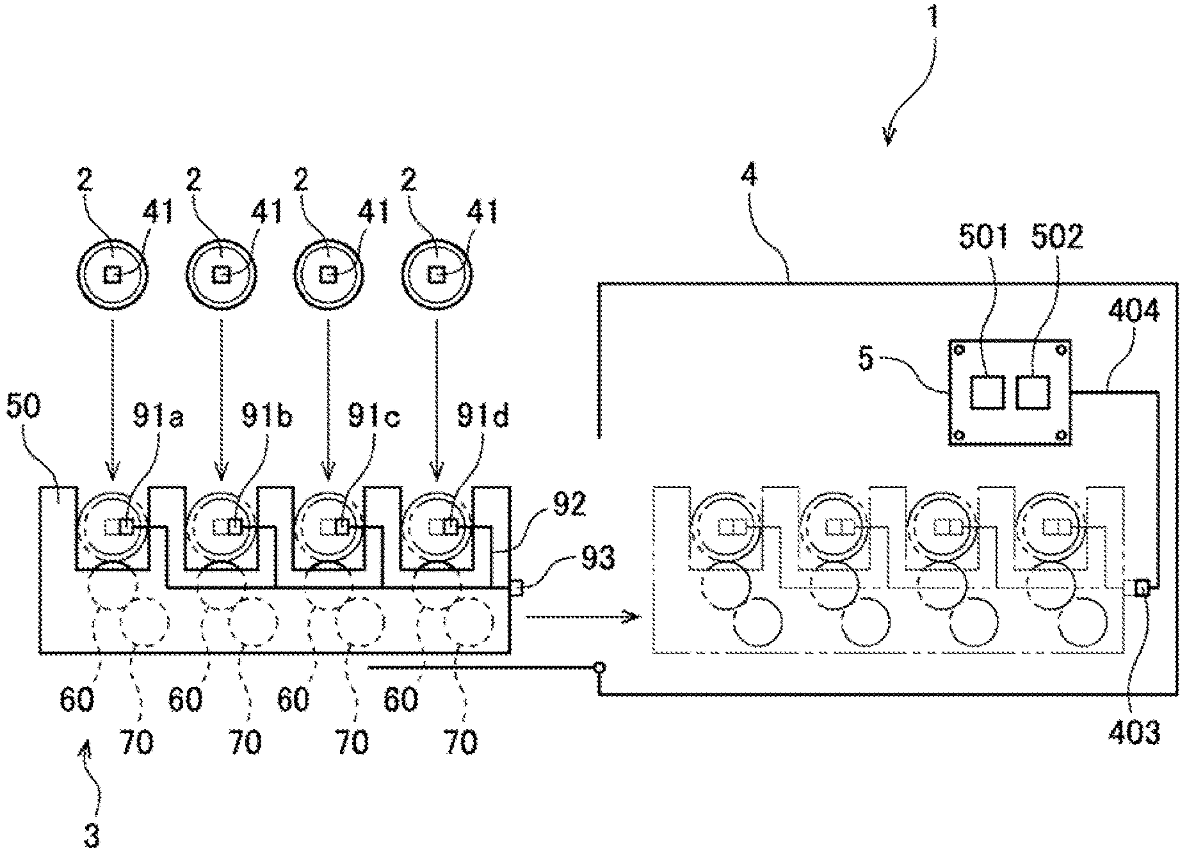
FIG. 1 is a schematic diagram of an image forming apparatus.

FIG. 1 is a schematic diagram of an image forming apparatus 1. The image forming apparatus 1 is an electro-photographic type printer. Specifically, the image forming apparatus 1 is a laser printer or an LED printer. As illustrated in FIG. 1, the image forming apparatus 1 includes four of the toner cartridges 2, the drum cartridge 3, a main frame 4, and a controller 5.

As illustrated in FIG. 1, the four toner cartridges 2 are attachable to and detachable from the drum cartridge 3. Further, the drum cartridge 3 to which the four toner cartridges 2 are attached is a drawer that is attachable to and detachable from the main frame 4. In the present embodiment, the number of toner cartridges 2 attachable to the drum cartridge 3 is four. However, the number of toner cartridges 2 attachable to the drum cartridge 3 may be one to three, or may be five or more.

The four toner cartridges 2 accommodate therein toner of colors different from one another (cyan, magenta, yellow, and black, for example). The image forming apparatus 1 is configured to form an image on a printing sheet using the toner supplied from the four toner cartridges 2.

The controller 5 is positioned inside the main frame 4. The controller 5 includes a processor 501 such as a CPU, and a main memory 502. The main memory 502 is a storage medium from which information is readable and to which information is writable. The processor 501 is configured to perform reading information from the main memory 502 and writing information into the main memory 502. The controller 5 is configured to control printing operations performed in the image forming apparatus 1 by the processor 501 operating in accordance with program stored in the main memory 502.

Each of the four toner cartridges 2 includes an IC chip 41. The IC chip 41 is a storage medium from which information is readable and to which information is writable. The drum cartridge 3 includes four drum contacts 91*a*, 91*b*, 91*c*, and 91*d*, a drum harness 92 as an example of the "harness", and a drum connector 93. The four drum contacts 91*a* to 91*d* are electrically connected to the drum connector 93 through the drum harness 92. Further, the image forming apparatus 1 further includes a main connector 403, and a main harness 404 those are accommodated in the main frame 4. The main connector 403 is electrically connected to the controller 5 through the main harness 404.

The IC chips 41 are brought into contact with the corresponding drum contacts 91*a* to 91*d* when the toner cartridges 2 are attached to the drum cartridge 3. Hence, the IC chips 41 are electrically connected to the corresponding drum contacts 91*a* to 91*d*. Further, the drum connector 93 is brought into contact with the main connector 403 when the drum cartridge 3 to which the toner cartridges 2 are attached is attached to the main frame 4. Therefore, the drum connector 93 is electrically connected to the main connector 403. As a result, the IC chips 41 are electrically connected to the controller 5 through the corresponding drum contacts 91*a* to 91*d*, the drum harness 92, the drum connector 93, the main connector 403, and the main harness 404. Thus, the controller 5 can perform reading information from the IC chips 41 and writing information in the IC chips 41.

Figure 2:
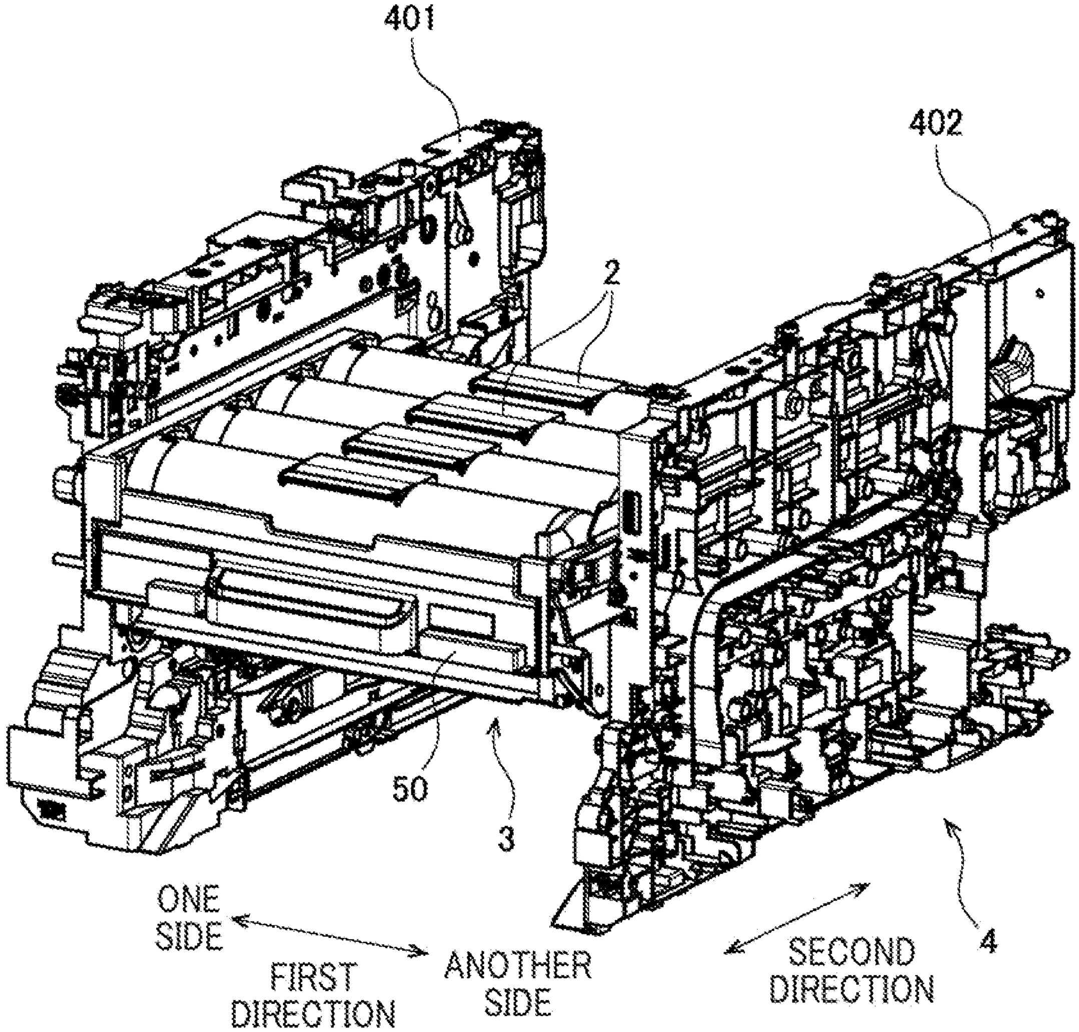
FIG. 2 is a perspective view illustrating four toner cartridges, a drum cartridge, and a part of a main frame.

FIG. 2 is a perspective view illustrating the four toner cartridges 2, the drum cartridge 3, and a part of the main frame 4. As illustrated in FIG. 2, the main frame 4 includes a first side plate 401, and a second side plate 402. Each of the first side plate 401 and the second side plate 402 has a substantially flat plate shape extending in a direction orthogonal to the first direction. The first side plate 401 and the second side plate 402 are spaced apart from each other in the first direction. The drum cartridge 3 to which the four toner cartridges 2 are attached can be inserted in the second direction into a position between the first side plate 401 and the second side plate 402.

<2. Toner Cartridges>

Figure 3:
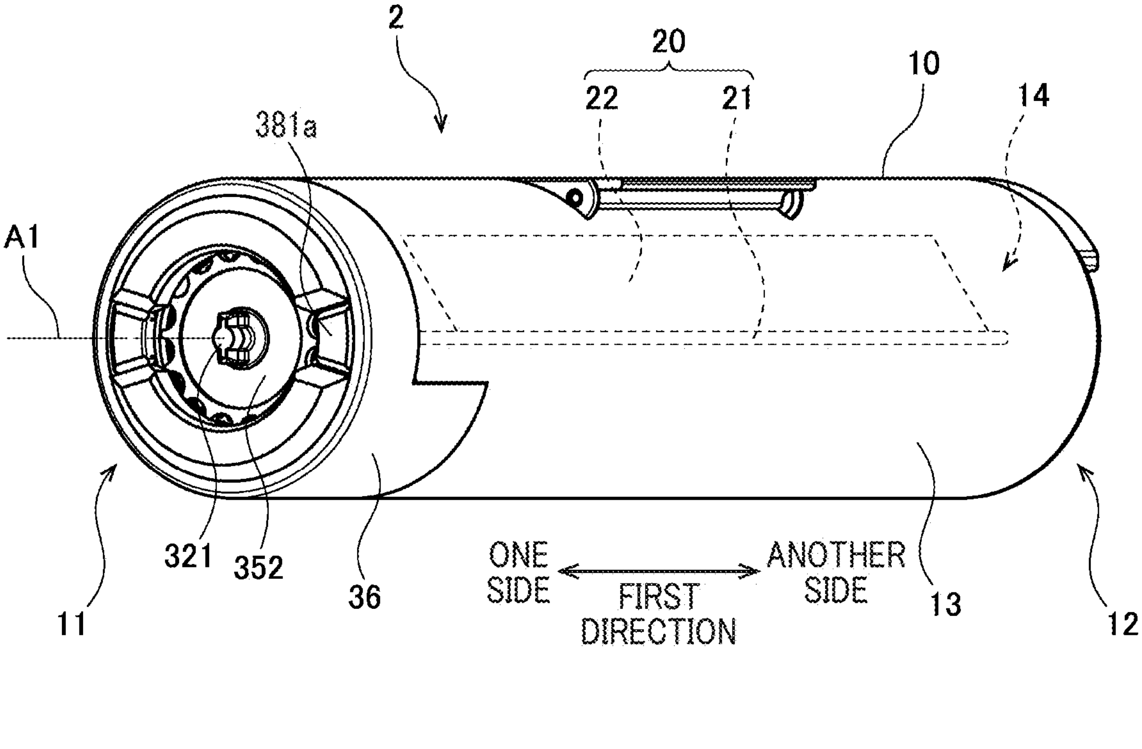
FIG. 3 is a perspective view of the toner cartridge.
Figure 4:
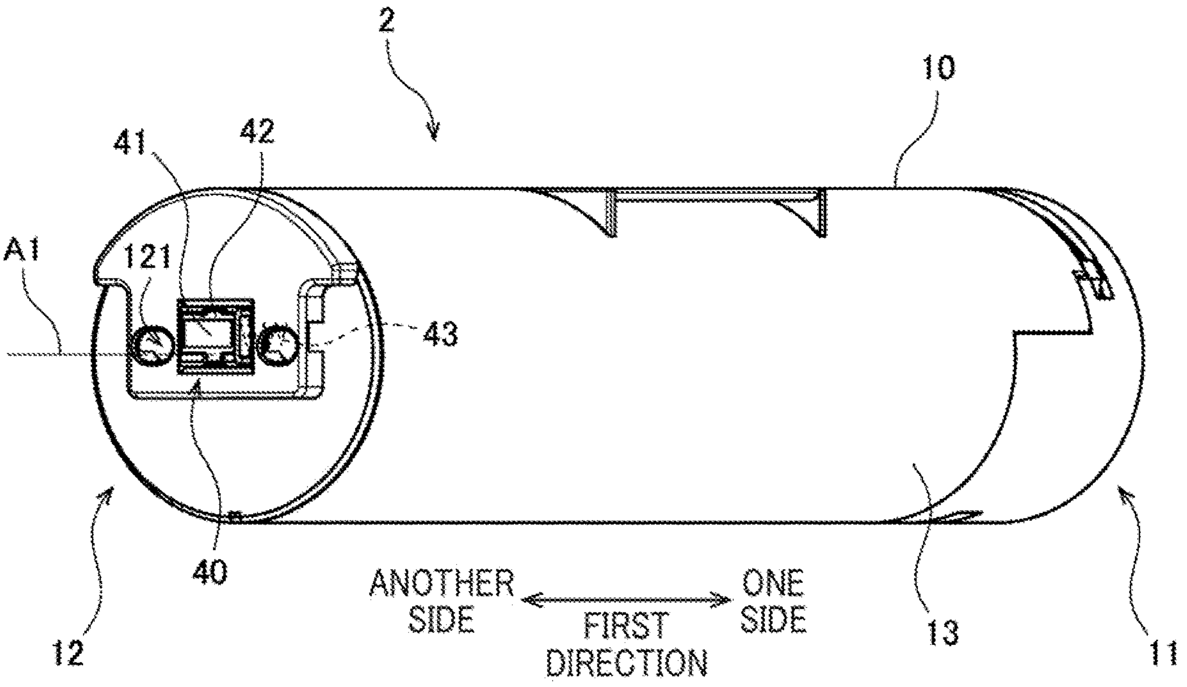
FIG. 4 is another perspective view of the toner cartridge.
Figure 5:
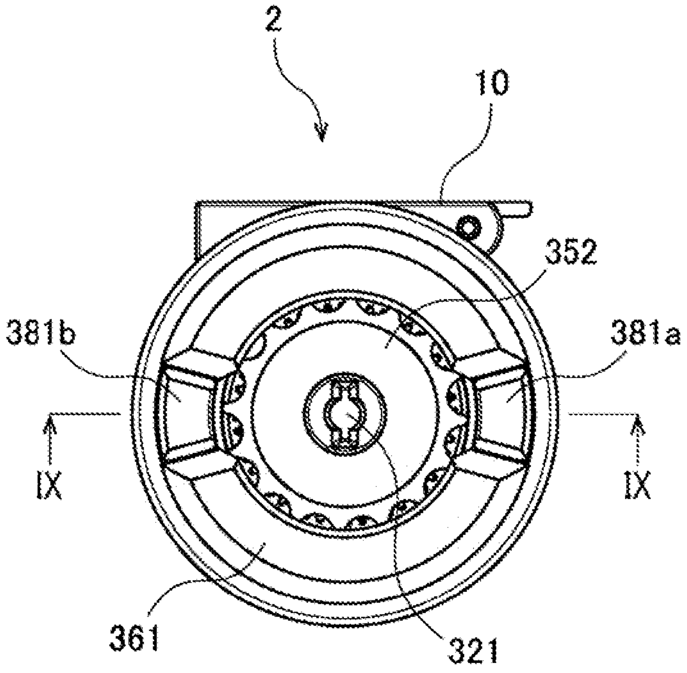
FIG. 5 is a view of the toner cartridge as viewed in a first direction.
Figure 6:
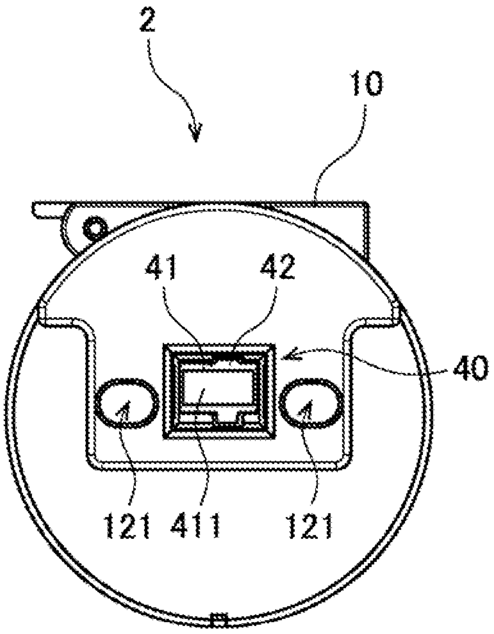
FIG. 6 is another view of the toner cartridge as viewed in the first direction.
Figure 7:
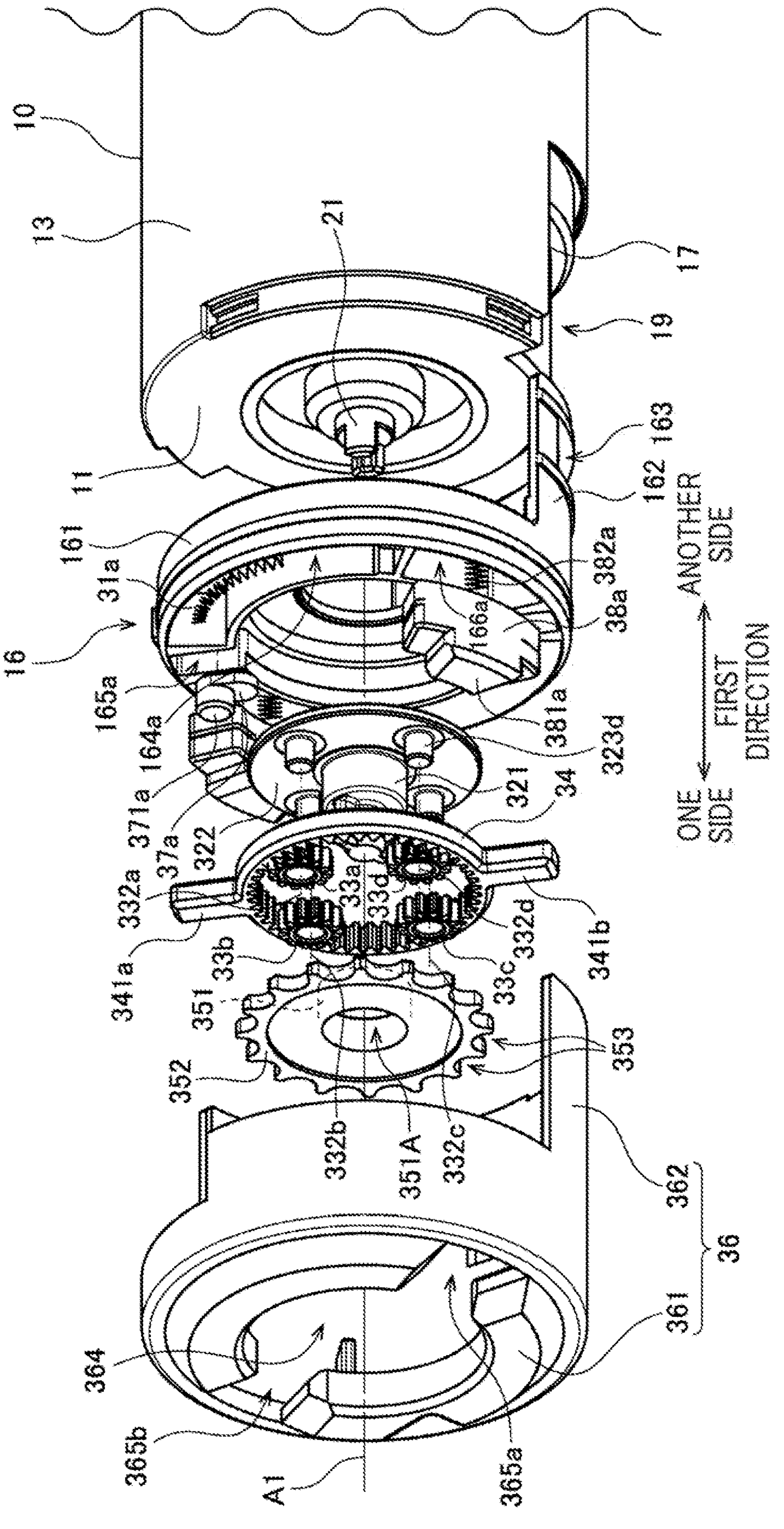
FIG. 7 is a partial exploded perspective view of the toner cartridge.
Figure 8:
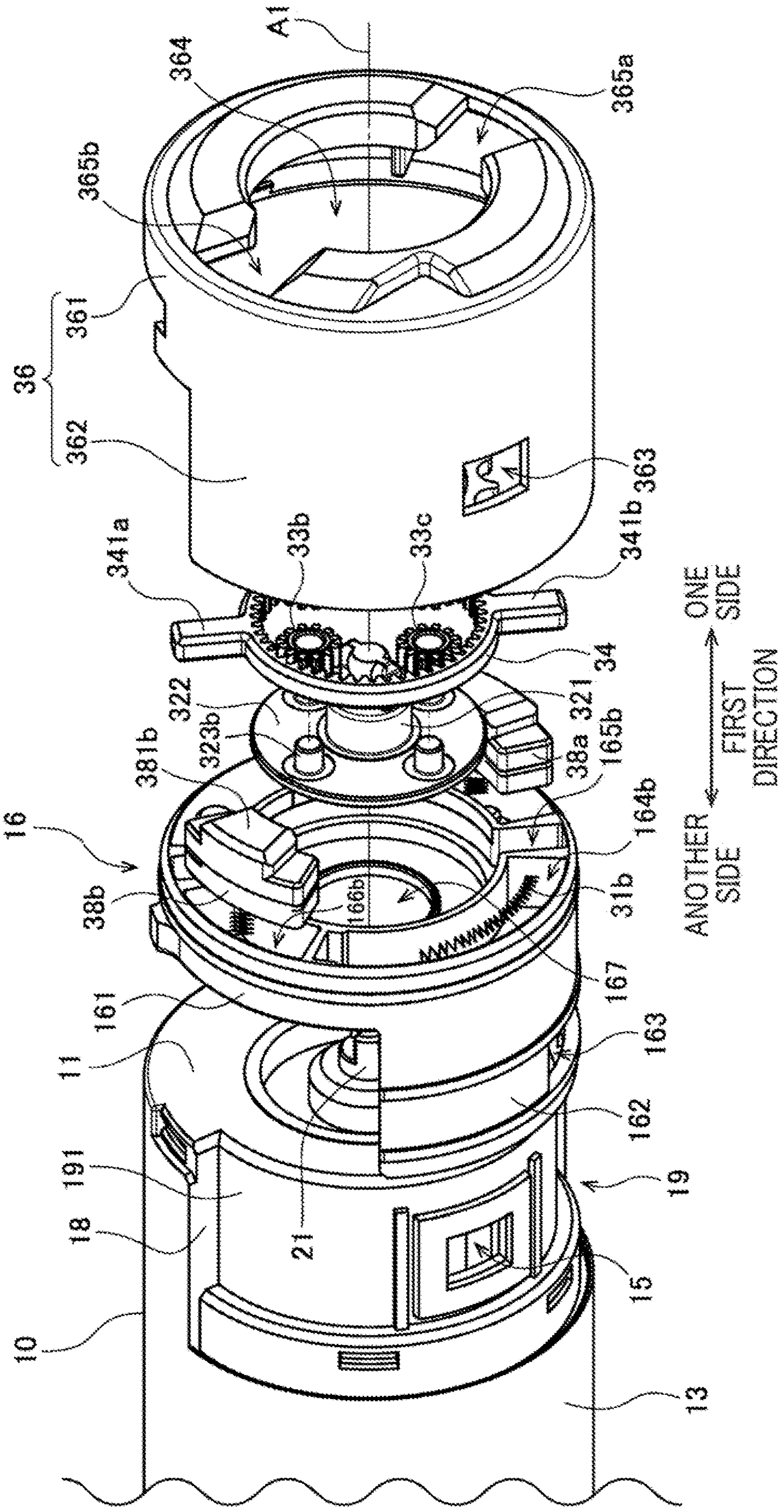
FIG. 8 is another partial exploded perspective view of the toner cartridge.
Figure 9:
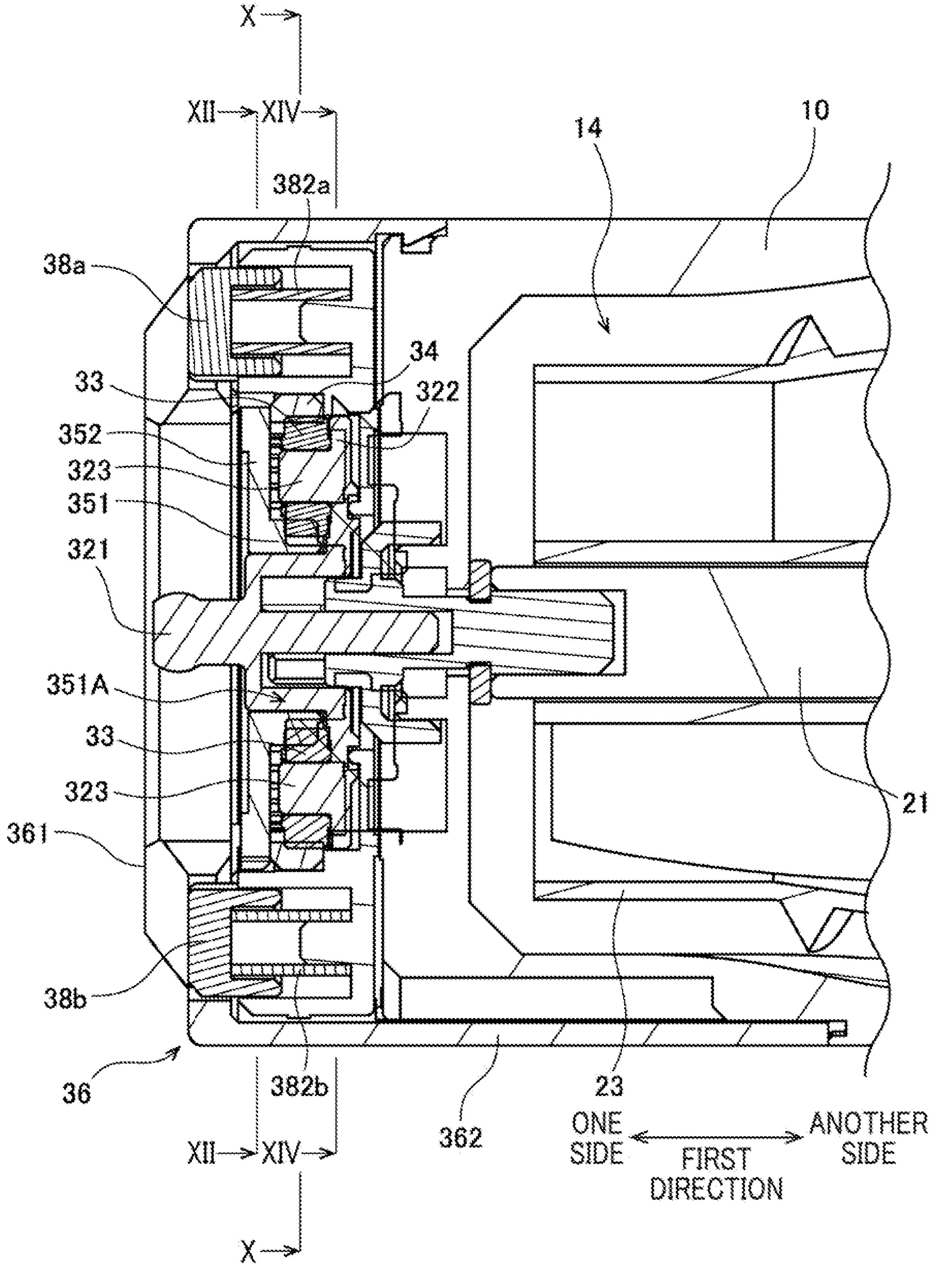
FIG. 9 is a cross-sectional view of the toner cartridge taken along line IX-IX in FIG. 5.

Next, configurations of the toner cartridges 2 will be described. FIGS. 3 and 4 are perspective views of the toner cartridge 2. FIG. 5 is a view illustrating the toner cartridge 2 as viewed from a first end portion 11 (described later) in the first direction. FIG. 6 is a view illustrating the toner cartridge 2 as viewed from a second end portion 12 (described later) in the first direction. FIGS. 7 and 8 are partial exploded perspective views of the toner cartridge 2. FIG. 9 is a cross-sectional view taken along line IX-IX in FIG. 5.

As illustrated in FIGS. 3 to 9, the toner cartridge 2 includes a casing 10, a shutter 16, the agitator 20, two return springs 31*a* and 31*b*, a toner coupling 321, a planetary carrier 322, a first planetary gear 33*a*, a second planetary gear 33*b*, a third planetary gear 33*c*, a fourth planetary gear 33*d*, an internal gear 34, a sun gear 351, a rotary plate 352, a cover 36, two bosses 37*a* and 37*b*, two locking members 38*a* and 38*b*, and an IC chip assembly 40.

The casing 10 is a container configured to accommodate therein toner as developing agent. The casing 10 extends in the first direction. The casing 10 has the first end portion 11, the second end portion 12, and a sleeve-like peripheral surface 13. The first end portion 11 is spaced apart from the second end portion 12 in the first direction. The two return springs 31*a* and 31*b*, the toner coupling 321, the planetary carrier 322, the first to fourth planetary gears 33*a* to 33*d*, the internal gear 34, the sun gear 351, the rotary plate 352, the cover 36, the two bosses 37*a* and 37*b*, and the two locking members 38*a* and 38*b* are positioned at the first end portion 11.

The IC chip assembly 40 is positioned at the second end portion 12. The peripheral surface 13 extends in the first direction between the first end portion 11 and the second end portion 12. The peripheral surface 13 has a sleeve shape centered on a first axis A1 extending in the first direction.

The casing 10 defines therein an accommodation chamber 14. The toner is accommodated in the accommodation chamber 14. Further, as illustrated in FIG. 8, the casing 10 has a toner discharge opening 15 as an example of the "toner supply opening". The toner discharge opening 15 is positioned at one end portion in the first direction of the peripheral surface 13.

The shutter 16 is also positioned at the first end portion 11 of the casing 10. The shutter 16 includes a holder 161, and a shutter plate 162. The holder 161 has a substantially disc-like shape centered on the first axis A1. The shutter plate 162 extends from a portion of the holder 161 in a direction from the first end portion 11 to the second end portion 12 of the casing 10 in the first direction. The shutter plate 162 has a shutter opening 163.

The shutter 16 is rotatable relative to the casing 10 about the first axis A1 between a closed position in which the shutter 16 closes the toner discharge opening 15 and an open position in which the shutter 16 opens the toner discharge opening 15. The shutter plate 162 covers the toner discharge opening 15 when the shutter 16 is in the closed position. Accordingly, the shutter 16 closes the toner discharge opening 15.

The shutter opening 163 of the shutter 16 is overlapped with the toner discharge opening 15 when the shutter 16 is in the open position. Hence, the shutter 16 opens the toner discharge opening 15. At this time, the accommodation chamber 14 is in communication with an outside of the casing 10 through the toner discharge opening 15, the shutter opening 163, and a communication opening 363 (described later) of the cover 36. As a result, toner accommodated in the accommodation chamber 14 can be supplied to the drum cartridge 3.

The casing 10 has a recess 19 positioned at the peripheral surface 13. The shutter plate 162 of the shutter 16 is positioned in the recess 19. The recess 19 has a first surface 191, a first stopper surface 18, and a second stopper surface 17. The first surface 191 has the toner discharge opening 15. Each of the first stopper surface 18 and the second stopper surface 17 extends outward from the first surface 191 in a radial direction of an agitator shaft 21 (described later).

The first stopper surface 18 is configured to stop movement of the shutter 16 in a direction from the closed position toward the open position in a rotational direction of the shutter 16. The shutter 16 is in contact with the first stopper surface 18 when the shutter 16 is in the open position. The second stopper surface 17 is configured to stop movement of the shutter 16 in a direction from the open position toward the closed position in the rotational direction of the shutter 16. The shutter 16 is in contact with the second stopper surface 17 when the shutter 16 is in the closed position. With this configuration, a movable range of the shutter 16 is limited to a range between the closed position and the open position.

Incidentally, the first stopper surface 18 need not be configured to completely stop the movement of the shutter 16 in the rotational direction thereof, but the shutter 16 may be slightly movable in a state where the shutter 16 is in contact with the first stopper surface 18. Similarly, the second stopper surface 17 need not be configured to completely stop the movement of the shutter 16 in the rotational direction thereof, but the shutter 16 may be slightly movable in a state where the shutter 16 is in contact with the second stopper surface 17.

In the present embodiment, both the toner discharge opening 15 and the first stopper surface 18 are provided at the casing 10. Hence, accurate positioning of the shutter 16 relative to the toner discharge opening 15 can be attained. Further, in the present embodiment, both the toner discharge opening 15 and the second stopper surface 17 are provided at the casing 10. Hence, accurate positioning of the shutter 16 relative to the toner discharge opening 15 can also be attained. Alternatively, the cover 36 may have the first stopper surface 18 and the second stopper surface 17. Still Alternatively, the first stopper surface 18 and the second stopper surface 17 may be included in components other than the casing 10 or the cover 36.

The holder 161 has a circular hole 167 penetrating the holder 161 in the first direction. The toner coupling 321, the planetary carrier 322, the internal gear 34, the sun gear 351, and the rotary plate 352 those will be described later are positioned in the circular hole 167.

Figure 10:
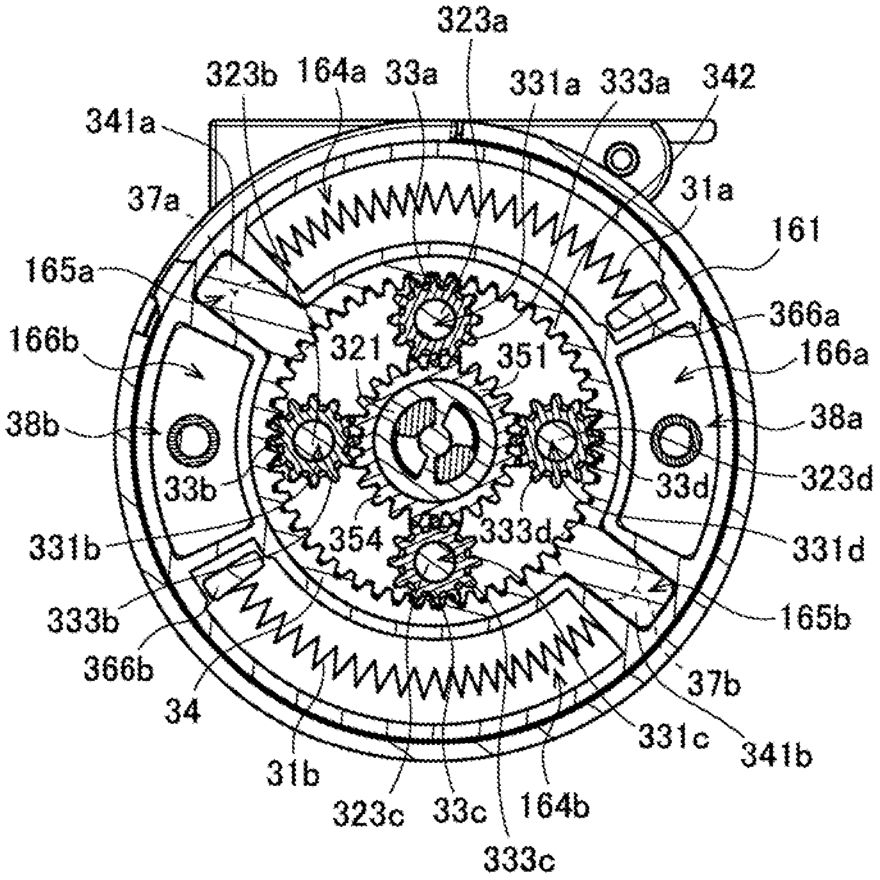
FIG. 10 is a cross-sectional view taken along line X-X in FIG. 9.

FIG. 10 is a cross-sectional view taken along line X-X in FIG. 9. As illustrated in FIG. 10, the holder 161 has a first recess 164*a*, a second recess 165*a*, a third recess 166*a*, a fourth recess 164*b*, a fifth recess 165*b*, and a sixth recess 166*b*. The first recess 164*a*, the second recess 165*a*, the third recess 166*a*, the fourth recess 164*b*, the fifth recess 165*b*, and the sixth recess 166*b* are recessed in the direction from the first end portion 11 to the second end portion 12 of the casing 10. The first recess 164*a*, the second recess 165*a*, the third recess 166*a*, the fourth recess 164*b*, the fifth recess 165*b*, and the sixth recess 166*b* are arranged along a periphery of the circular hole 167.

The agitator 20 is a conveying member configured to agitate and convey the toner in the casing 10. The agitator 20 is positioned inside the casing 10. As indicated by a broken line in FIG. 3, the agitator 20 includes the agitator shaft 21, and an agitator fin 22. The agitator shaft 21 extends in the first direction along the first axis A1. The agitator shaft 21 has one end portion and another end portion. The one end portion is positioned at the first end portion 11 of the casing 10, and the other end portion is positioned at the second end portion 12 of the casing 10. The agitator fin 22 extends radially outward from the agitator shaft 21. That is, the agitator fin 22 extends toward an inner peripheral surface of the casing 10 from the agitator shaft 21.

The toner coupling 321 is connected to the one end portion of the agitator shaft 21. Hence, rotation of the toner coupling 321 about the first axis A1 causes rotation of the agitator shaft 21 and the agitator fin 22 about the first axis A1. As the agitator fin 22 rotates, the toner accommodated in the casing 10 is agitated.

Further, as illustrated in FIG. 9, the agitator 20 further includes a sleeve member 23. The sleeve member 23 is fixed to the agitator shaft 21. The sleeve member 23 is positioned closer to the one end portion of the agitator shaft 21 than to the other end portion of the agitator shaft 21. The sleeve member 23 has an outer peripheral surface having a helical groove.

The two return springs 31*a* and 31*b*, the toner coupling 321, the planetary carrier 322, the first to fourth planetary gears 33*a* to 33*d*, the internal gear 34, the sun gear 351, the rotary plate 352, the cover 36, the two bosses 37*a* and 37*b*, and the two locking members 38*a* and 38*b* constitute a mechanism for operating the shutter 16 and the agitator 20. As described above, the two return springs 31*a* and 31*b*, the toner coupling 321, the planetary carrier 322, the first to fourth planetary gears 33*a* to 33*d*, the internal gear 34, the sun gear 351, the rotary plate 352, the cover 36, the two bosses 37*a* and 37*b*, and the two locking members 38*a* and 38*b* are positioned at the first end portion 11.

The two return springs 31*a* and 31*b* are elastic members for urging the shutter 16 from the open position toward the closed position. As illustrated in FIG. 10, the return spring 31*a* is accommodated in the first recess 164*a* in the holder 161. The return spring 31*b* is accommodated in the fourth recess 164*b* in the holder 161. Each of the first recess 164*a* and the fourth recess 164*b* has an arc shape centered on the first axis A1. The return spring 31*a* has one end portion in a circumferential direction centered on the first axis A1 connected to the holder 161, and another end portion in the circumferential direction connected to a spring seat 366*a* (described later) of the cover 36.

Similarly, the return spring 31*b* has one end portion in the circumferential direction connected to the holder 161, and another end portion in the circumferential direction connected to a spring seat 366*b* (described later) of the cover 36. Lengths of the two return springs 31*a* and 31*b* in the rotational direction of the shutter 16 are changed in accordance with the movement of the shutter 16 between the closed position and the open position.

The lengths of the two return springs 31*a* and 31*b* in the rotational direction of the shutter 16 are configured to be changed between a first state (a state illustrated in FIG. 10) and a second state. Specifically, the lengths of the return springs 31*a* and 31*b* in the second state are shorter than those in the first state. Further, the lengths of the return springs 31*a* and 31*b* in the second state are shorter than natural lengths of the return springs 31*a* and 31*b* in the rotational direction. The two return springs 31*a* and 31*b* are in the first state when the shutter 16 is in the closed position, and the two return springs 31*a* and 31*b* are in the second state when the shutter 16 is in the open position.

The toner coupling 321 is a member that can be coupled to a corresponding relay coupling 82 (FIG. 16, described later) of the drum cartridge 3. In a state where the toner coupling 321 is coupled to the relay coupling 82, the toner coupling 321 can receive a driving force from the relay coupling 82. The toner coupling 321 is rotatable about the first axis A1 upon receiving the driving force from the relay coupling 82. As described above, the toner coupling 321 is connected to the one end portion in the first direction of the agitator shaft 21. Accordingly, rotation of the toner coupling 321 causes the agitator 20 to rotate about the first axis A1 together with the toner coupling 321.

The toner coupling 321 has one end portion and another end portion. The one end portion of the toner coupling 321 is positioned away from the other end portion of the toner coupling 321 in the first direction. The one end portion of the toner coupling 321 is positioned farther from the first end portion 11 of the casing 10 than the other end portion of the toner coupling 321 is from the first end portion 11 of the casing 10 in the first direction. In other words, the other end portion of the toner coupling 321 is positioned closer to the first end portion 11 of the casing 10 than the one end portion of the toner coupling 321 is to the first end portion 11 of the casing 10 in the first direction.

The planetary carrier 322 extends radially outward from the other end portion in the first direction of the toner coupling 321. In the present embodiment, the toner coupling 321 and the planetary carrier 322 are formed as a single member. Alternatively, the toner coupling 321 and the planetary carrier 322 may be components different from each other as long as the planetary carrier 322 is rotatable about the first axis A1 together with the toner coupling 321.

The planetary carrier 322 includes a first planetary pin 323*a*, a second planetary pin 323*b*, a third planetary pin 323*c*, and a fourth planetary pin 323*d*. Each of the first to fourth planetary pins 323*a* to 323*d* extends from the planetary carrier 322 in the direction from the first end portion 11 to the second end portion 12 in the first direction. Each of the first to fourth planetary pins 323*a* to 323*d* has a columnar shape. The first to fourth planetary pins 323*a* to 323*d* are arranged to be spaced apart from each other in the circumferential direction centered on the first axis A1. Preferably, the first to fourth planetary pins 323*a* to 323*d* are arranged to be spaced apart from each other at regular intervals in the circumferential direction centered on the first axis A1. The first to fourth planetary pins 323*a* to 323*d* will also be collectively referred to as "planetary pins 323".

The first to fourth planetary gears 33*a* to 33*d* are arranged to be spaced apart from each other in the circumferential direction centered on the first axis A1. Preferably, the first to fourth planetary gears 33*a* to 33*d* are arranged to be spaced apart from each other at regular intervals in the circumferential direction centered on the first axis A1. The first to fourth planetary gears 33*a* to 33*d* will also be collectively referred to as "planetary gears 33".

The first planetary gear 33*a* has a first hole 331*a*. The first planetary pin 323*a* is inserted in the first hole 331*a*. Accordingly, the first planetary gear 33*a* is supported by the first planetary pin 323*a*. The first planetary gear 33*a* is rotatable about a first planetary axis 332*a* relative to the planetary carrier 322 while the first planetary pin 323*a* is inserted in the first hole 331*a*. The first planetary axis 332*a* passes through a center of the first planetary pin 323*a*. The first planetary gear 33*a* has an outer peripheral surface including a plurality of gear teeth 333*a*.

The second planetary gear 33*b* has a second hole 331*b*. The second planetary pin 323*b* is inserted through the second hole 331*b*. The second planetary gear 33*b* is supported by the second planetary pin 323*b*. The second planetary gear 33*b* is rotatable about a second planetary axis 332*b* relative to the planetary carrier 322 while the second planetary pin 323*b* is inserted in the second hole 331*b*. The second planetary axis 332*b* passes through a center of the second planetary pin 323*b*. The second planetary gear 33*b* has an outer peripheral surface including a plurality of gear teeth 333*b*.

The third planetary gear 33*c* has a third hole 331*c*. The third planetary pin 323*c* is inserted in the third hole 331*c*. The third planetary gear 33*c* is supported by the third planetary pin 323*c*. The third planetary gear 33*c* is rotatable about a third planetary axis 332*c* relative to the planetary carrier 322 while the third planetary pin 323*c* is inserted in the third hole 331*c*. The third planetary axis 332*c* passes through a center of the third planetary pin 323*c*. The third planetary gear 33*c* has an outer peripheral surface including a plurality of gear teeth 333*c*.

The fourth planetary gear 33*d* has a fourth hole 331*d*. The fourth planetary pin 323*d* is inserted in the fourth hole 331*d*. The fourth planetary gear 33*d* is supported by the fourth planetary pin 323*d*. The fourth planetary gear 33*d* is rotatable about a fourth planetary axis 332*d* relative to the planetary carrier 322 while the fourth planetary pin 323*d* is inserted in the fourth hole 331*d*. The fourth planetary axis 332*d* passes through a center of the fourth planetary pin 323*d*. The fourth planetary gear 33*d* has an outer peripheral surface including a plurality of gear teeth 333*d*.

In the present embodiment, the single planetary carrier 322 supports the first to fourth planetary gears 33*a* to 33*d*. Accordingly, the second to fourth planetary gears 33*b* to 33*d* can be accurately positioned relative to the first planetary gear 33*a*.

Further, in response to the rotation of the toner coupling 321 about the first axis A1, the first to fourth planetary gears 33*a* to 33*d* circularly moves about the first axis A1 together with rotation of the toner coupling 321 and the planetary carrier 322. In this way, the first to fourth planetary gears 33*a* to 33*d* are rotatable about their planetary gear axes 332*a* to 332*d*, and are orbitally movable about the sun gear 351 (described later).

The internal gear 34 is an annular gear surrounding the first to fourth planetary gears 33*a* to 33*d*. The internal gear 34 is disposed such that a center axis of the internal gear 34 is coincident with the first axis A1. The internal gear 34 has an inner peripheral surface including a plurality of gear teeth 342. The plurality of gear teeth 342 are in meshing engagement with the gear teeth 333*a* of the first planetary gear 33*a*, the gear teeth 333*b* of the second planetary gear 33*b*, the gear teeth 333*c* of the third planetary gear 33*c*, and the gear teeth 333*d* of the fourth planetary gear 33*d*.

The internal gear 34 includes two arms 341*a* and 341*b*. Each of the arms 341*a* and 341*b* extends radially outward from an outer peripheral surface of the internal gear 34. That is, each of the arms 341*a* and 341*b* extends in a direction away from the first to fourth planetary gears 33*a* to 33*d* relative to the gear teeth 342 of the internal gear 34. The arm 341*a* is fitted in the second recess 165*a* in the holder 161, and the arm 341*b* is fitted in the fifth recess 165*b* in the holder 161. Hence, the shutter 16 is rotatable together with the internal gear 34. Accordingly, as the internal gear 34 rotates about the first axis A1, the shutter 16 also rotates about the first axis A1 together with the internal gear 34.

The sun gear 351 is a gear rotatable about the first axis A1. The first to fourth planetary gears 33*a* to 33*d* are positioned around the sun gear 351. The sun gear 351 has an outer peripheral surface including a plurality of gear teeth 354. The plurality of gear teeth 354 are in meshing engagement with the gear teeth 333*a* of the first planetary gear 33*a*, the gear teeth 333*b* of the second planetary gear 33*b*, the gear teeth 333*c* of the third planetary gear 33*c*, and the gear teeth 333*d* of the fourth planetary gear 33*d*. The sun gear 351 has a circular hole 351A centered on the first axis A1. The toner coupling 321 is inserted in the hole 351A of the sun gear 351.

The toner coupling 321, the sun gear 351, the four (first to fourth) planetary gears 33*a* to 33*d*, and the internal gear 34 are positioned on the same imaginary plane perpendicular to the first axis A1. In other words, the sun gear 351 is positioned farther from the first axis A1 than the toner coupling 321 is from the first axis A1 in the radial direction of the agitator shaft 21 that is perpendicular to the first axis A1. The first to fourth planetary gears 33*a* to 33*d* are positioned farther from the first axis A1 than the sun gear 351 is from the first axis A1 in the radial direction of the agitator shaft 21. The internal gear 34 is positioned farther from the first axis A1 than the first to fourth planetary gears 33*a* to 33*d* are from the first axis A1 in the radial direction of the agitator shaft 21. That is, the toner coupling 321, the sun gear 351, the first to fourth planetary gears 33*a* to 33*d*, and the internal gear 34 are aligned with one another in the radial direction of the agitator shaft 21. Hence, a dimension in the first direction of the toner cartridge 2 can be reduced.

The sun gear 351 has one end portion and another end portion. The one end portion of the sun gear 351 is positioned away from the other end portion of the sun gear 351 in the first direction. The one end portion of the sun gear 351 is positioned farther from the first end portion 11 of the casing 10 than the other end portion of the sun gear 351 is from the first end portion 11 of the casing 10 in the first direction. In other words, the other end portion of the sun gear 351 is positioned closer to the first end portion 11 of the casing 10 than the one end portion of the sun gear 351 is to the first end portion 11 of the casing 10 in the first direction.

The rotary plate 352 extends radially outward from the one end portion of the sun gear 351. The rotary plate 352 is rotatable about the first axis A1 together with the sun gear 351. In the present embodiment, the sun gear 351 and the rotary plate 352 are configured as a single member. Alternatively, the sun gear 351 and the rotary plate 352 may be configured of members different from each other as long as the rotary plate 352 is rotatable about the first axis A1 together with the rotation of the sun gear 351.

The rotary plate 352 has an outer peripheral surface having a plurality of grooves 353. The plurality of grooves 353 are arranged along the outer peripheral surface of the rotary plate 352 so as to be spaced apart from one another. Preferably, the plurality of grooves 353 are arranged along the outer peripheral surface of the rotary plate 352 so as to be spaced apart from one another at regular intervals. Each of the grooves 353 is recessed radially inward from the outer peripheral surface of the rotary plate 352. Each of the grooves 353 has an arc shape when viewed in the first direction.

The cover 36 is fixed to the first end portion 11 of the casing 10. The cover 36 includes a gear cover portion 361, and a shutter cover portion 362. The gear cover portion 361 has a substantially circular plate shape centered on the first axis A1. The shutter cover portion 362 extends toward the casing 10 in the first direction from a part of an outer peripheral portion of the gear cover portion 361. The two return springs 31*a* and 31*b*, the toner coupling 321, the planetary carrier 322, the first to fourth planetary gears 33*a* to 33*d*, the internal gear 34, the sun gear 351, the rotary plate 352, and the two bosses 37*a* and 37*b* are positioned between the first end portion 11 of the casing 10 and the gear cover portion 361 in the first direction. The shutter cover portion 362 covers at least a portion of the shutter plate 162.

The shutter cover portion 362 has the communication opening 363. The communication opening 363 is overlapped with the toner discharge opening 15 both when the shutter 16 is in the closed position and when the shutter 16 is in the open position. The communication opening 363 is closed with the shutter plate 162 when the shutter 16 is in the closed position. The shutter opening 163 is overlapped with both the toner discharge opening 15 and the communication opening 363 when the shutter 16 is in the open position. As a result, the accommodation chamber 14 is in communication with the outside of the casing 10 through the toner discharge opening 15, the shutter opening 163, and the communication opening 363.

Figure 11:
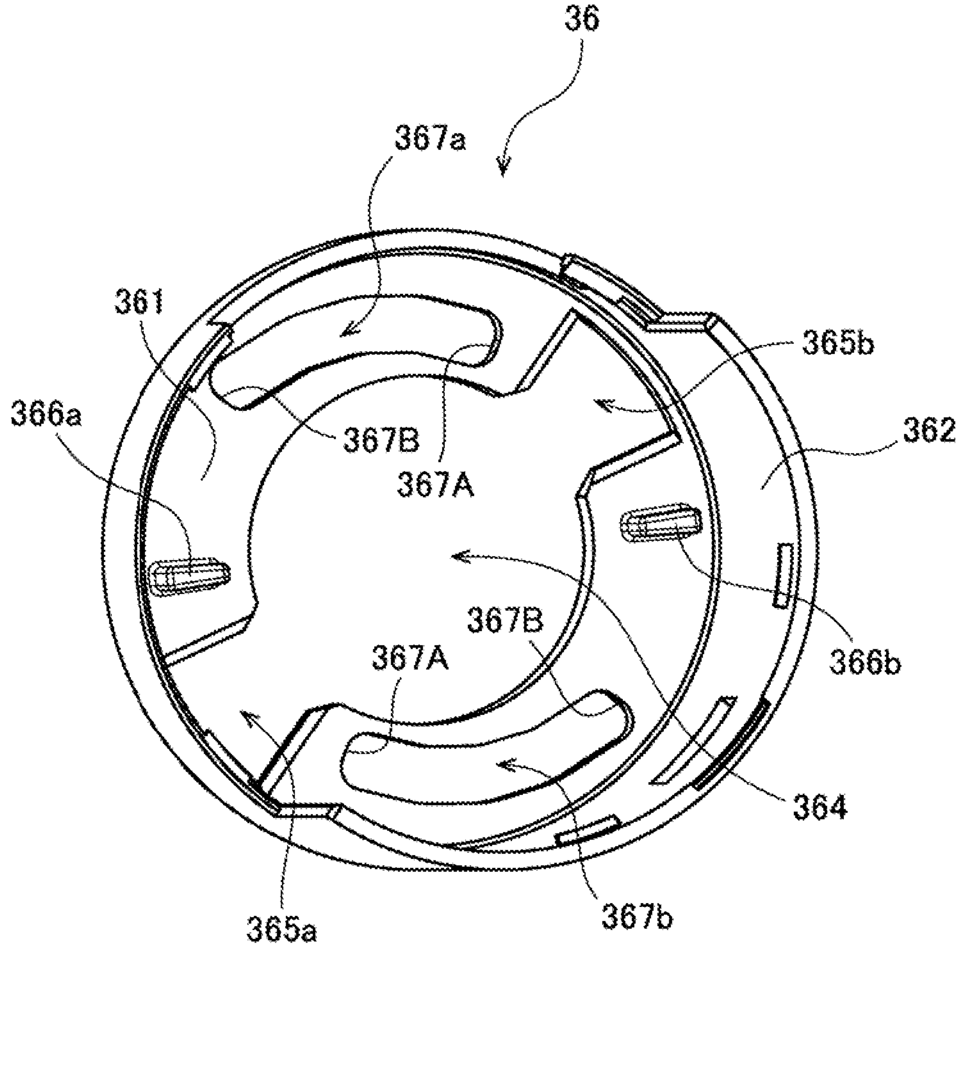
FIG. 11 is a view of a cover as viewed in the first direction.

FIG. 11 is a view illustrating the cover 36 as viewed in a direction from the second end portion 12 to the first end portion 11 of the casing 10 in the first direction. As illustrated in FIG. 11, the cover 36 has a center through-hole 364, two side through-holes 365*a* and 365*b*, and two guide grooves 367*a* and 367*b*. Further, the cover 36 includes the two spring seats 366*a* and 366*b*.

The center through-hole 364 and the two side through-holes 365*a* and 365*b* penetrate the gear cover portion 361 in the first direction. The center through-hole 364 is positioned at a center of the gear cover portion 361. The center through-hole 364 has a circular shape when viewed in the first direction. The toner coupling 321 is exposed to an outside of the cover 36 through the center through-hole 364. The two side through-holes 365*a* and 365*b* are positioned around the center through-hole 364. The two side through-holes 365*a* and 365*b* are positioned opposite to each other relative to the center through-hole 364. Each of the two side through-holes 365*a* and 365*b* has a rectangular shape when viewed in the first direction. The locking members 38*a* and 38*b* (described later) are exposed to the outside of the cover 36 through the side through-holes 365*a* and 365*b*, respectively.

The two spring seats 366*a* and 366*b* protrude toward the shutter 16 from the gear cover portion 361 in the first direction. The two spring seats 366*a* and 366*b* are positioned opposite to each other relative to the center through-hole 364. As described above, the other end portion of the return spring 31*a* is connected to the spring seat 366*a*, and the other end portion of the return spring 31*b* is connected to the spring seat 366*b*.

The guide groove 367*a* is a groove for guiding the boss 37*a*. The guide groove 367*b* is a groove for guiding the boss 37*b*. The two guide grooves 367*a* and 367*b* are positioned at a surface of the gear cover portion 361 that faces the shutter 16 in the first direction. The guide grooves 367*a* and 367*b* are positioned opposite to each other relative to the center through-hole 364. Each of the guide grooves 367*a* and 367*b* extends in the rotational direction of the shutter 16. Each of the guide grooves 367*a* and 367*b* has an arc shape. Each of the guide grooves 367*a* and 367*b* has one end 367A and another end 367B. The one end 367A is closer to the first axis A1 than the other end 367B is to the first axis A1.

The two bosses 37*a* and 37*b* are positioned around the rotary plate 352. The boss 37*a* is inserted in the second recess 165*a* in the holder 161. The boss 37*b* is inserted in the fifth recess 165*b* in the holder 161. Hence, when the shutter 16 rotates about the first axis A1, the boss 37*a* moves along with the second recess 165*a* in the circumferential direction centered on the first axis A1, and the boss 37*b* moves along with the fifth recess 165*b* in the circumferential direction centered on the first axis A1.

Figure 12:
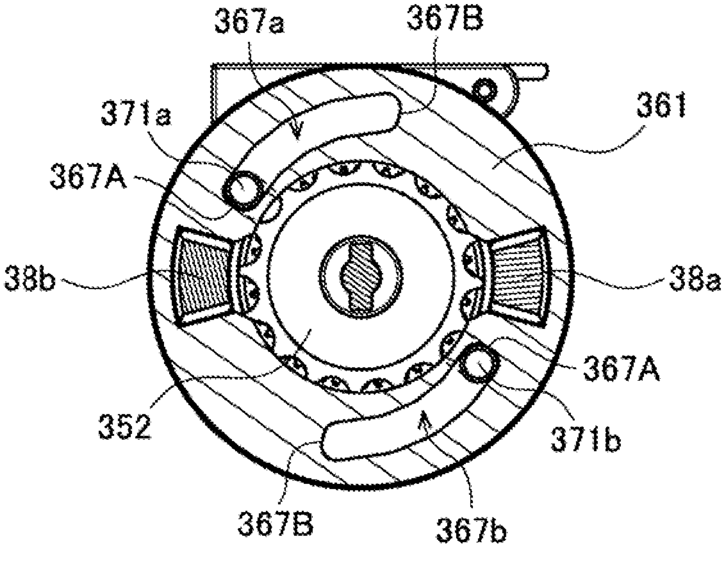
FIG. 12 is a cross-sectional view taken along line XII-XII in FIG. 9.
Figure 13:
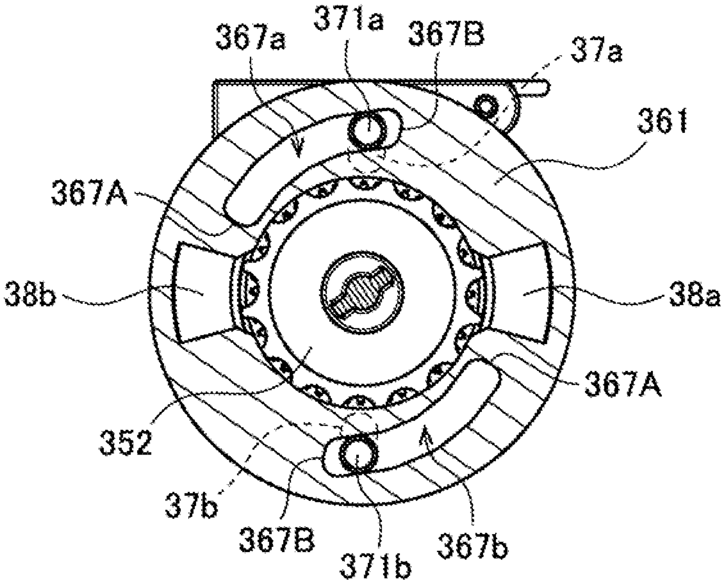
FIG. 13 is a cross-sectional view taken along line XII-XII in FIG. 9.

The second recess 165*a* extends in a radial direction centered on the first axis A1. Therefore, the boss 37*a* is movable along the second recess 165*a* in the radial direction between a first position (FIG. 12) and a second position (FIG. 13). The boss 37*a* in the second position is positioned radially outward of the boss 37*a* in the first position. The boss 37*a* has one end portion and another end portion in the radial direction, and the one end portion of the boss 37*a* is positioned radially inward of the other end portion.

When the boss 37*a* is in the first position, the one end portion of the boss 37*a* is positioned in one of the plurality of grooves 353 of the rotary plate 352. When the boss 37*a* is in the second position, the entire portion of the boss 37*a* is positioned outside of the plurality of grooves 353. Since the plurality of grooves 353 are arranged over the entire outer peripheral surface of the rotary plate 352, the boss 37*a* can be inserted in one of the plurality of grooves 353 of the rotary plate 352 regardless of a rotational position of the rotary plate 352.

The fifth recess 165*b* extends in the radial direction centered on the first axis A1. Therefore, the boss 37*b* is movable along the fifth recess 165*b* in the radial direction between a first position (FIG. 12) and a second position (FIG. 13). The boss 37*b* in the second position is positioned radially outward of the boss 37*b* in the first position. The boss 37*b* has one end portion and another end portion in the radial direction, and the one end portion of the boss 37*b* is positioned radially inward of the other end portion. When the boss 37*b* is in the first position, the one end portion of the boss 37*b* is positioned in one of the plurality of grooves 353 of the rotary plate 352. When the boss 37*b* is in the second position, the entire portion of the boss 37*b* is positioned outside of the plurality of grooves 353.

The boss 37*a* includes a guide protrusion 371*a*. The guide protrusion 371*a* protrudes in the first direction from the boss 37*a* toward the guide groove 367*a*. The boss 37*b* includes a guide protrusion 371*b*. The guide protrusion 371*b* protrudes in the first direction from the boss 37*b* toward the guide groove 367*b*. FIGS. 12 and 13 are cross-sectional views taken along line XII-XII in FIG. 9. FIG. 12 illustrates a state where the shutter 16 is in the closed position, and FIG. 13 illustrates a state where the shutter 16 is in the open position. As illustrated in FIGS. 12 and 13, a distal end portion of the guide protrusion 371*a* is fitted in the guide groove 367*a* of the cover 36, and a distal end portion of the guide protrusion 371*b* is fitted in the guide groove 367*b* of the cover 36.

When the relay coupling 82 (described later) is not coupled to the toner coupling 321, that is, when a driving force is not supplied to the toner coupling 321, the return springs 31*a* and 31*b* are in their first states. Hence, the shutter 16 is in the closed position. Accordingly, the toner discharge opening 15 is closed with the shutter plate 162. At this time, as illustrated in FIG. 12, the guide protrusion 371*a* of the boss 37*a* is positioned at the one end 367A of the guide groove 367*a*, and the guide protrusion 371*b* of the boss 37*b* is positioned at the one end 367A of the guide groove 367*b*.

Further, the bosses 37*a* and 37*b* are in their first positions. Accordingly, the one end portions of the bosses 37*a* and 37*b* are respectively fitted in two grooves 353 of the plurality of grooves 353 of the rotary plate 352. That is, the boss 37*a* is fitted in both the second recess 165*a* in the shutter 16 and one of the plurality of groove 353 of the rotary plate 352. Further, the boss 37*b* is fitted in both the fifth recess 165*b* in the shutter 16 and another one of the plurality of grooves 353 of the rotary plate 352. Consequently, the shutter 16 and the internal gear 34 are rotatable together with the sun gear 351, the rotary plate 352, and the two bosses 37*a* and 37*b*.

In such a state, the internal gear 34 is not rotatable relative to the sun gear 351. That is, the internal gear 34 rotates together with the rotation of the sun gear 351. Hence, the first planetary gear 33*a* in meshing engagement with both the internal gear 34 and the sun gear 351 is not rotatable about the first planetary axis 332*a*. Similarly, the second planetary gear 33*b*, the third planetary gear 33*c*, and the fourth planetary gear 33*d* are not rotatable about the second planetary axis 332*b*, the third planetary axis 332*c*, and the fourth planetary axis 332*d*, respectively.

Thus, as the driving force is supplied to the toner coupling 321 in this state, the toner coupling 321 rotates such that the shutter 16 rotates about the first axis A1 together with the planetary carrier 322, the first to fourth planetary gears 33*a* to 33*d*, the sun gear 351, the rotary plate 352, the two bosses 37*a* and 37*b*, and the internal gear 34. As a result, the shutter 16 moves from the closed position to the open position, thereby opening the toner discharge opening 15.

In accordance with the rotation of the shutter 16 from the closed position to the open position, the return springs 31*a* and 31*b* contract from the first states to the second states, and the movement of the shutter 16 is stopped upon abutment of the shutter 16 against the first stopper surface 18 (see FIG. 8). At this time, as illustrated in FIG. 13, the guide protrusion 371*a* of the boss 37*a* moves to the other end 367B from the one end 367A of the guide groove 367*a*, and the guide protrusion 371*b* of the boss 37*b* moves to the other end 367B from the one end 367A of the guide groove 367*b*.

In response to the movement of the guide protrusions 371*a* and 371*b* along the guide grooves 367*a* and 367*b*, the boss 37*a* moves from the first position to the second position along the second recess 165*a*, and the boss 37*b* moves from the first position to the second position along the fifth recess 165*b*. Hence, the bosses 37*a* and 37*b* separates from the plurality of grooves 353 of the rotary plate 352. That is, the boss 37*a* is fitted in the second recess 165*a* in the shutter 16 while the boss 37*a* is separated from the grooves 353 of the rotary plate 352, and the boss 37*b* is fitted in the fifth recess 165*b* of the shutter 16 while the boss 37*b* is separated from the grooves 353 of the rotary plate 352. As a result, the sun gear 351 and the rotary plate 352 become rotatable relative to the shutter 16 and the internal gear 34.

As described above, the rotational movement of the shutter 16 and the internal gear 34 is stopped in response to the abutment of the shutter 16 against the first stopper surface 18. However, the sun gear 351 is rotatable relative to the internal gear 34, since the bosses 37*a* and 37*b* are moved away from the grooves 353 of the rotary plate 352. Accordingly, the first to fourth planetary gears 33*a* to 33*d* rotate about the first to fourth planetary axes 332*a* to 332*d*, respectively, while the first to fourth planetary gears 33*a* to 33*d* are in meshing engagement with the internal gear 34 and the sun gear 351. Therefore, the first to fourth planetary gears 33*a* to 33*d* are orbitally moved about the sun gear 351 while the first to fourth planetary gears 33*a* to 33*d* rotate about the first to fourth planetary axes 332*a* to 332*d*, respectively. Further, because of the meshing engagement with the first to fourth planetary gears 33*a* to 33*d*, the sun gear 351 rotates about the first axis A1. At this time, the sun gear 351 rotates at a speed higher than that of the toner coupling 321.

As such, the first to fourth planetary gears 33*a* to 33*d* and the sun gear 351 are rotatable relative to the internal gear 34 in a state where the two bosses 37*a* and 37*b* are in their second positions. Hence, in accordance with the rotation of the toner coupling 321, the first to fourth planetary gears 33*a* to 33*d* and the sun gear 351 are rotatable, whereas the internal gear 34 is not rotatable. Accordingly, the shutter 16 is maintained at the open position irrespective of the further rotation of the toner coupling 321 after the shutter 16 is moved to the open position.

Further, as described above, the toner coupling 321 is connected to the one end portion of the agitator shaft 21. Accordingly, as the toner coupling 321 rotates about the first axis A1, the agitator 20 also rotates about the first axis A1. Hence, the rotation of the agitator 20 continues by the rotation of the toner coupling 321 even after the shutter 16 is stopped at the open position. Accordingly, the toner accommodated in the casing 10 is agitated.

In this way, in the toner cartridge 2, both the movement of the shutter 16 and the rotation of the agitator 20 can be attained by the rotation of the toner coupling 321. Specifically, in accordance with the rotation of the toner coupling 321, the agitator 20 rotates, and the shutter 16 moves from the closed position to the open position. Further, as the shutter 16 moves from the closed position to the open position, the bosses 37*a* and 37*b* moves to their second positions from their first positions, whereby the first to fourth planetary gears 33*a* to 33*d* and the sun gear 351 are rotatable freely whereas the internal gear 34 stops rotating. Accordingly, the rotation of the agitator 20 continues while the shutter 16 is maintained at the open position.

Then, the return springs 31*a* and 31*b* expand from their second states to their first states due to their resilient force as supply of the driving force to the toner coupling 321 is stopped. Hence, the shutter 16 moves from the open position to the closed position. As a result, the toner discharge opening 15 is closed again with the shutter plate 162.

Each of the two locking members 38*a* and 38*b* is a member for locking the shutter 16 to stop the rotation thereof. The locking member 38*a* is configured to be fitted in the third recess 166*a* of the holder 161. The locking member 38*b* is configured to be fitted in the sixth recess 166*b* of the holder 161.

The locking member 38*a* includes a locking protrusion 381*a*, and a locking spring 382*a*. The locking protrusion 381*a* is movable in the first direction between a locking position and an unlocking position. The locking protrusion 381*a* in the unlocking position is farther from the cover 36 than the locking protrusion 381*a* in the locking position is from the cover 36 in the first direction. The locking protrusion 381*a* is positioned outside the third recess 166*a* when the locking protrusion 381*a* is in the locking position. The locking protrusion 381*a* is positioned inside the third recess 166*a* when the locking protrusion 381*a* is in the unlocking position.

The locking member 38*b* includes a locking protrusion 381*b*, and a locking spring 382*b*. The locking protrusion 381*b* is movable in the first direction between a locking position and an unlocking position. The locking protrusion 381*b* in the unlocking position is farther from the cover 36 than the locking protrusion 381*b* in the locking position is from the cover 36 in the first direction. The locking protrusion 381*b* is positioned outside the sixth recess 166*b* when the locking protrusion 381*b* is in the locking position. The locking protrusion 381*b* is positioned inside the sixth recess 166*b* when the locking protrusion 381*b* is in the unlocking position.

The locking spring 382*a* is interposed between the locking protrusion 381*a* and the holder 161. The locking spring 382*a* is an elastic member. The locking spring 382*a* has a length in the first direction that can be changed between an expansion state and a compression state. The length in the first direction of the locking spring 382*a* in the expansion state is longer than that in the compression state. The locking protrusion 381*a* is in the locking position when the locking spring 382*a* is in the expansion state. The locking protrusion 381*a* is in the unlocking position when the locking spring 382*a* is in the compression state. The locking protrusion 381*a* is constantly urged from the unlocking position toward the locking position due to a resilient force of the locking spring 382*a*.

The locking spring 382*b* is interposed between the locking protrusion 381*b* and the holder 161. The locking spring 382*b* is an elastic member. The locking spring 382*b* has a length in the first direction that can be changed between an expansion state and a compression state. The length in the first direction of the locking spring 382*b* in the expansion state is longer than that in the compression state. The locking protrusion 381*b* is in the locking position when the locking spring 382*b* is in the expansion state. The locking protrusion 381*b* is in the unlocking position when the locking spring 382*b* is in the compression state. The locking protrusion 381*b* is constantly urged from the unlocking position toward the locking position due to a resilient force of the locking spring 382*b*.

The locking protrusion 381*a* protrudes from the locking member 38*a* toward the side through-hole 365*a* of the cover 36. The locking protrusion 381*a* is inserted in the side through-hole 365*a* when the locking spring 382*a* is in the expansion state, i.e., the locking protrusion 381*a* is in the locking position. The locking protrusion 381*b* protrudes from the locking member 38*b* toward the side through-hole 365*b* of the cover 36. The locking protrusion 381*b* is inserted in the side through-hole 365*b* when the locking spring 382*b* is in the expansion state, i.e., the locking protrusion 381*b* is in the locking position.

The locking member 38*a* is in contact with both the cover 36 and the holder 161 in a state where the locking protrusion 381*a* is inserted in the side through-hole 365*a*. Similarly, the locking member 38*b* is in contact with both the cover 36 and the holder 161 in a state where the locking protrusion 381*b* is inserted in the side through-hole 365*b*. With such a state, the shutter 16 is not rotatable about the first axis A1 relative to the casing 10 and the cover 36. In other words, the shutter 16 is immovable from the closed position to the open position.

The locking springs 382*a* and 382*b* are compressed from the expansion states to the compression states when the locking protrusions 381*a* and 381*b* are pressed toward the holder 161 by one of unlocking members 81 (described later) of the drum cartridge 3. Accordingly, the locking protrusions 381*a* and 381*b* move from the locking positions to the unlocking positions, whereby the locking protrusions 381*a* and 381*b* disengage from the side through-holes 365*a* and 365*b* of the cover 36, respectively. As a result, the locking protrusions 381*a* and 381*b* separates from the cover 36. With this state, the locking members 38*a* and 38*b*, and the shutter 16 are rotatable about the first axis A1 relative to the casing 10 and the cover 36. Consequently, the shutter 16 is movable from the closed position to the open position.

According to the above-described configuration in the present embodiment, the shutter 16 does not become unlocked unless the two locking protrusions 381*a* and 381*b* are simultaneously pressed by the corresponding unlocking member 81. This configuration can restrain the shutter 16 from being unintentionally unlocked due to the user's erroneous operation in a state where the toner cartridge 2 is not attached to the drum cartridge 3.

Figure 14:
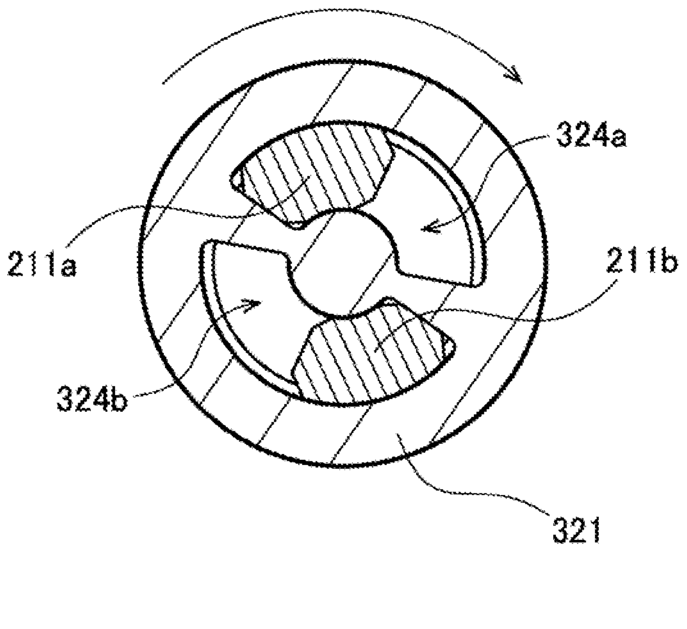
FIG. 14 is a cross-sectional view of a connecting portion between an agitator shaft and a toner coupling taken along line XIV-XIV in FIG. 9.
Figure 15:
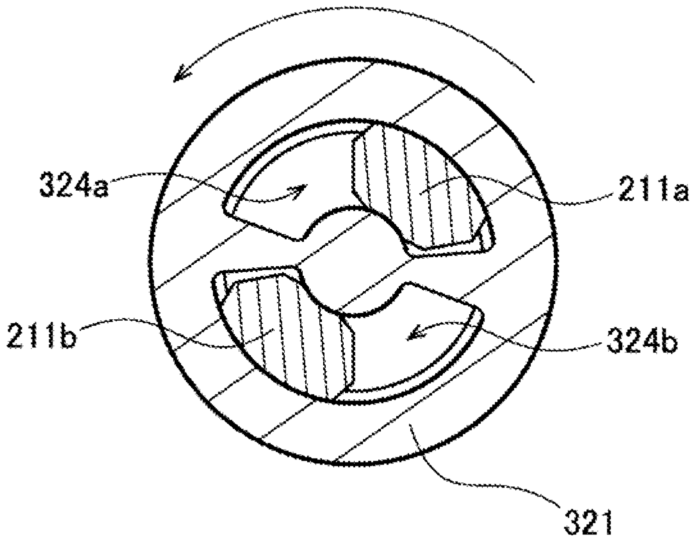
FIG. 15 is another cross-sectional view of the connecting portion between the agitator shaft and the toner coupling taken along line XIV-XIV in FIG. 9.

FIGS. 14 and 15 are cross-sectional views of a connecting portion between the agitator shaft 21 and the toner coupling 321 taken along line XIV-XIV in FIG. 9. As illustrated in FIGS. 14 and 15, the toner coupling 321 has two clutch holes 324*a* and 324*b*. Each of the clutch holes 324*a* and 324*b* is a through-hole penetrating the toner coupling 321 in the first direction, or a recess recessed in the first direction. Each of the clutch holes 324*a* and 324*b* has an arc shape centered on the first axis A1. In the meantime, the agitator shaft 21 includes two clutch pawls 211*a* and 211*b*. The clutch pawls 211*a* and 211*b* are positioned at the one end portion in the first direction of the agitator shaft 21.

The clutch pawls 211*a* and 211*b* are inserted in the clutch holes 324*a* and 324*b*, respectively. The clutch hole 324*a* has a dimension in the circumferential direction centered on the first axis A1 greater than that of the clutch pawl 211*a*, and the clutch hole 324*b* has a dimension in the circumferential direction centered on the first axis A1 greater than that of the clutch pawl 211*b*. Further, each of the clutch holes 324*a* and 324*b* has a center angle centered on the first axis A1 that is approximately equal to or greater than a rotation angle by which the shutter 16 rotates about the first axis A1 between the closed position and the open position.

When the shutter 16 moves from the closed position to the open position, the toner coupling 321 rotates about the first axis A1 in a rotational direction (indicated by an arrow in FIG. 14) the same as a direction in which the shutter 16 moves from the closed position to the open position. At this time, the clutch pawl 211*a* contacts one end in the circumferential direction of the clutch hole 324*a*, and the clutch pawl 211*b* contacts one end in the circumferential direction of the clutch hole 324*b*, thereby transmitting the rotational force of the toner coupling 321 to the agitator 20. Accordingly, the agitator 20 rotates together with the toner coupling 321 in the rotational direction the same as the direction in which the shutter 16 moves from the closed position to the open position. Further, the agitator 20 continues rotating together with the toner coupling 321 after the shutter 16 moves from the closed position to the open position.

On the other hand, when the shutter 16 moves from the open position to the closed position, the toner coupling 321 rotates about the first axis A1 in a rotational direction (as indicated by an arrow in FIG. 15) the same as a direction in which the shutter 16 moves from the open position to the closed position. That is, the rotational direction of the toner coupling 321 when the shutter 16 moves from the open position to the closed position is opposite to the rotational direction of the toner coupling 321 when the shutter 16 moves from the closed position to the open position. At this time, the one end in the circumferential direction of the clutch hole 324*a* separates from the clutch pawl 211*a*, and the one end in the circumferential direction of the clutch hole 324*b* separates from the clutch pawl 211*b*.

However, another end in the circumferential direction of the clutch hole 324*a* does not contact the clutch pawl 211*a*, and another end in the circumferential direction of the clutch hole 324*b* does not contact the clutch pawl 211*b*. Accordingly, the rotation of the toner coupling 321 is not transmitted to the agitator 20. This configuration can prevent the agitator 20 from rotating in the direction the same as the direction in which the shutter 16 moves from the open position to the closed position.

In this way, according to the present embodiment, the clutch holes 324*a* and 324*b*, and the clutch pawls 211*a* and 211*b* constitute a clutch mechanism that restrains the agitator 20 from rotating together with the toner coupling 321 when the shutter 16 moves from the open position to the closed position.

As described above, the IC chip assembly 40 is positioned at the second end portion 12 of the casing 10. The IC chip assembly 40 includes the IC chip 41 which is a storage medium, and a chip holder 42 holding the IC chip 41. The IC chip 41 is fixed to an outer surface of the chip holder 42. The IC chip 41 is configured to store therein various information related to the toner cartridge 2. Specifically, the IC chip 41 stores therein information indicating a capacity of toner accommodated in the toner cartridge 2, or a residual quantity of toner accommodated in the toner cartridge 2. Further, the IC chip 41 may store therein other information such as a specification of the toner cartridge 2. For example, the IC chip 41 may store therein a type of toner, a manufacturing serial number of the toner cartridge 2, an identification code indicating that the toner cartridge 2 is a genuine product, and a model compatible with the toner cartridge 2.

The IC chip 41 has an electrical contact surface 411 (see FIG. 6) made of metal which is an electrically conductive material. The electrical contact surface 411 is exposed to the outside at the outer surface of the second end portion 12 of the casing 10. Incidentally, only the electrical contact surface 411 of the IC chip 41 may be positioned at the outer surface of the second end portion 12 of the casing 10, and a remaining portion of the IC chip 41 other than the electrical contact surface 411 may be at a position of the casing 10 different from the second end portion 12.

The chip holder 42 is movable in the first direction relative to the casing 10. The electrical contact surface 411 of the IC chip 41 also moves in the first direction relative to the casing 10 together with the chip holder 42 in response to movement of the chip holder 42 in the first direction.

Further, as indicated by a broken like in FIG. 4, the toner cartridge 2 further includes an IC chip spring 43 as an example of the "second elastic member". The IC chip spring 43 is interposed between the second end portion 12 of the casing 10 and the chip holder 42, i.e., the second end portion 12 of the casing 10 and the electrical contact surface 411. When the drum cartridge 3 to which the toner cartridge 2 is attached is attached to the main frame 4, one of the drum contacts 91*a* to 91*d* (described later) is brought into contact with the electrical contact surface 411 of the IC chip 41. At this time, the IC chip spring 43 presses the electrical contact surface 411 in the first direction toward the corresponding one of the drum contacts 91*a* to 91*d* due to an urging force of the IC chip spring 43, whereby stabilized contact between the electrical contact surface 411 and the corresponding one of the drum contacts 91*a* to 91*d* can be established.

<3. Drum Cartridge>

Figure 16:
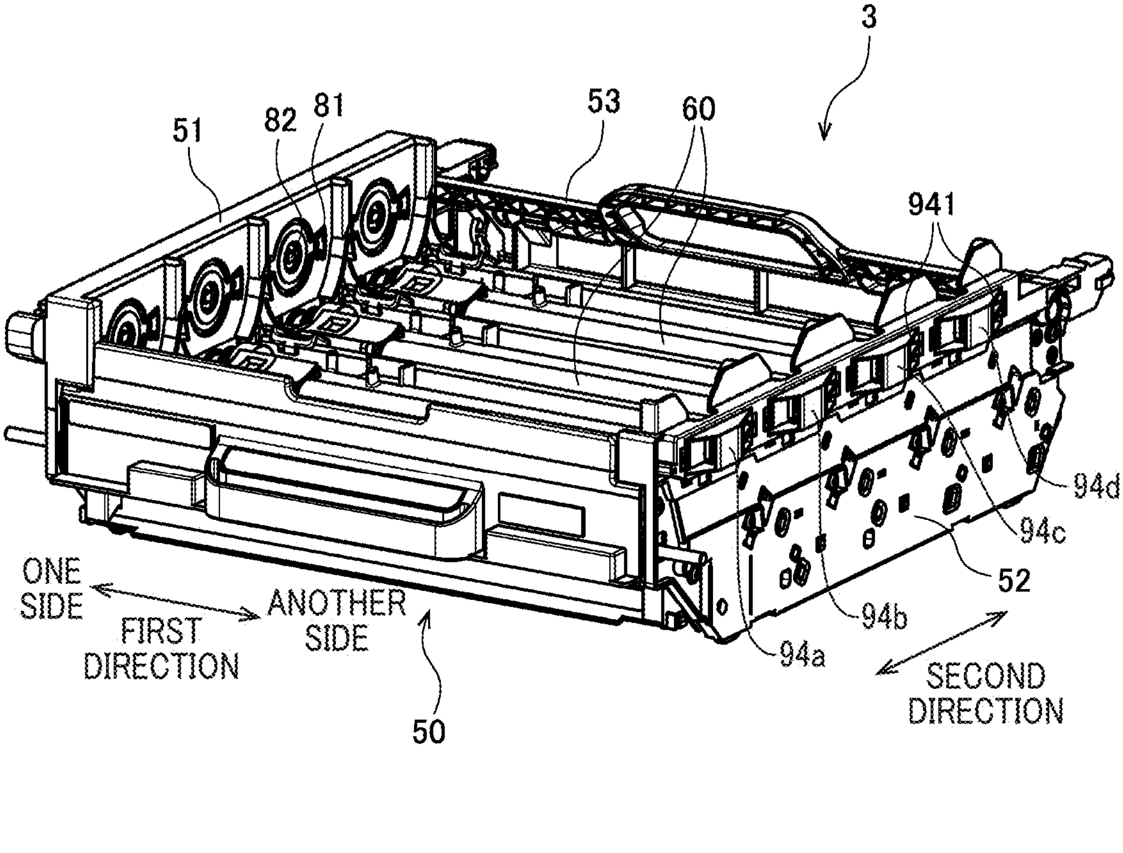
FIG. 16 is a perspective view of the drum cartridge.
Figure 17:
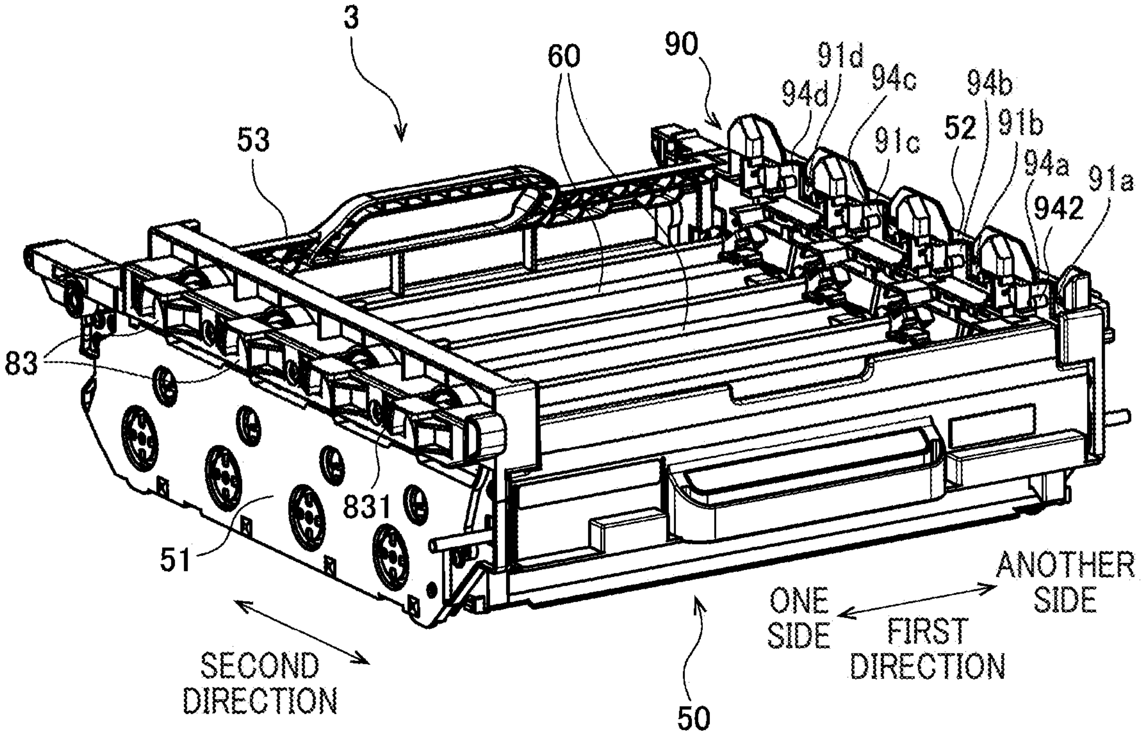
FIG. 17 is another perspective view of the drum cartridge.

Next, a configuration of the drum cartridge 3 will be described. FIGS. 16 and 17 are perspective views of the drum cartridge 3. The drum cartridge 3 includes a drum frame 50, four developing rollers 60, the four photosensitive drums 70, the four unlocking members 81, the four relay couplings 82, four contacting members 83, a plurality of tension springs 84, and a wiring portion 90.

The drum frame 50 is configured to receive the four toner cartridges 2. The drum frame 50 includes a first side frame 51, a second side frame 52, and a third frame 53. Each of the first side frame 51 and the second side frame 52 has a substantially flat plate shape and extends orthogonal to the first direction. The first side frame 51 and the second side frame 52 are spaced apart from each other in the first direction. The third frame 53 connects the first side frame 51 and the second side frame 52 to each other in the first direction. The four toner cartridges 2 can be inserted in a space between the first side frame 51 and the second side frame 52.

Each of the developing rollers 60 is rotatable about a rotation axis (a developing axis) extending in the first direction. In the present embodiment, each of the developing rollers 60 is a magnetic roller. Each of the developing rollers 60 has one end portion in the first direction supported by the first side frame 51, and another end portion in the first direction supported by the second side frame 52. The four developing rollers 60 are arranged to be spaced apart from one another in the second direction.

When the toner cartridges 2 are attached to the drum frame 50, the toner discharge openings 15 of the toner cartridges 2 face outer circumferential surfaces of the corresponding developing rollers 60. Also, when the drum cartridge 3 to which the toner cartridges 2 are attached is attached to the main frame 4, the developing rollers 60 rotate due to a driving force supplied from the image forming apparatus 1. The toner accommodated in the toner cartridges 2 are supplied to the outer circumferential surfaces of the corresponding developing rollers 60 through the toner discharge openings 15 after the toner discharge openings 15 are open by the movement of the shutters 16 from the closed positions to the open positions.

Each of the photosensitive drums 70 is rotatable about a rotation axis (a drum axis) extending in the first direction. Each of the photosensitive drums 70 has one end portion in the first direction supported by the first side frame 51, and another end portion in the first direction supported by the second side frame 52. That is, the first side frame 51 is positioned at the one end portions in the first direction of the photosensitive drums 70, and the second side frame 52 is positioned at the other end portions in the first direction of the photosensitive drums 70. The four photosensitive drums 70 are arranged to be spaced apart from each other in the second direction. Each of the photosensitive drums 70 has an outer circumferential surface coated with a photosensitive material. The outer circumferential surfaces of the developing rollers 60 and the outer circumferential surfaces of the corresponding photosensitive drum 70 are in separation from each other.

When the drum cartridge 3 to which the toner cartridges 2 are attached is attached to the main frame 4, the photosensitive drums 70 rotate due to the driving force supplied from the image forming apparatus 1. Further, when a printing process is performed, light is emitted to the outer circumferential surfaces of the photosensitive drums 70 from light sources (not illustrated) positioned in the main frame 4. Hence, the outer circumferential surfaces of the photosensitive drums 70 are partially exposed to light. The toner carried on the outer circumferential surfaces of the developing rollers 60 is supplied to the light-exposed portions of the photosensitive drums 70. Thereafter, the toner is transferred to the printing sheet. As a result, a toner image is formed on the printing sheet.

Figure 18:
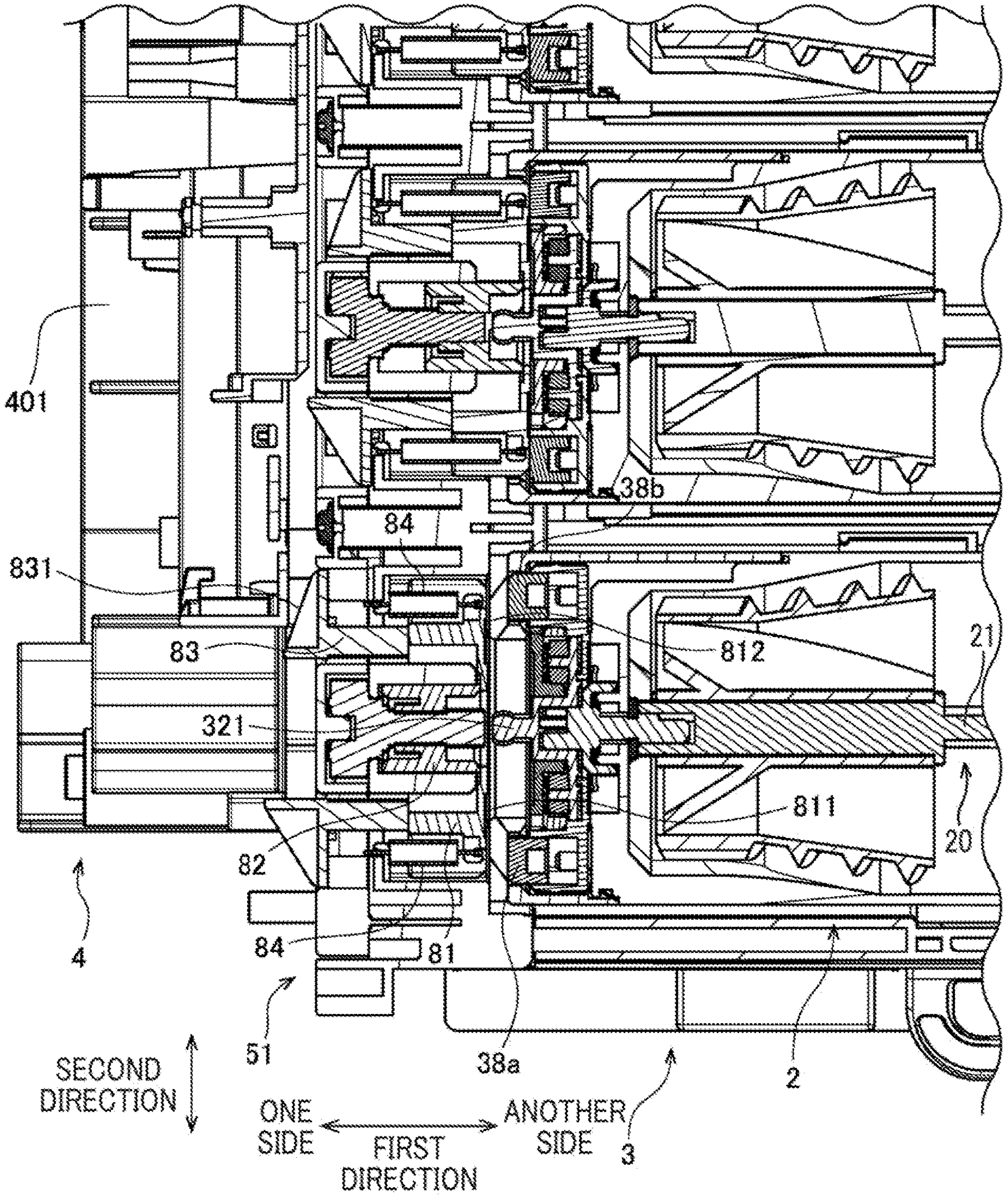
FIG. 18 is a partial cross-sectional view illustrating a state where the drum cartridge to which the toner cartridge is attached is in a process of being inserted into the main frame.

FIG. 18 is a partial cross-sectional view of the image forming apparatus 1, and particularly illustrating a state where the drum cartridge 3 to which the toner cartridges 2 are attached is in a process of being inserted into the main frame 4. As illustrated in FIG. 18, the unlocking members 81, the relay couplings 82, the contacting members 83, and the tension springs 84 are positioned at the first side frame 51.

Each of the unlocking members 81 is configured to unlock the shutter 16 of the corresponding toner cartridge 2 that is locked by the locking members 38*a* and 38*b*. The unlocking member 81 is movable in the first direction between a retracted position and an advanced position. The unlocking member 81 in the advanced position is closer to the second side frame 52 than the unlocking member 81 in the retracted position is to the second side frame 52 in the first direction.

Each of the unlocking members 81 includes a first pressure portion 811, and a second pressure portion 812. Each of the first pressure portion 811 and the second pressure portion 812 protrudes toward the second side frame 52. The first pressure portion 811 presses the locking protrusion 381*a* of the toner cartridge 2 and the second pressure portion 812 presses the locking protrusion 381*b* of the toner cartridge 2 when the unlocking member 81 is in the advanced position in a state where the toner cartridge 2 is attached to the drum frame 50.

Each of the relay couplings 82 is configured to transmit a driving force to the toner coupling 321 of the corresponding toner cartridge 2. Each of the relay couplings 82 is rotatable about a rotation axis (a coupling axis) extending in the first direction. Each of the relay couplings 82 is movable in the first direction together with the corresponding unlocking member 81 between the retracted position and the advanced position. The relay coupling 82 in the advanced position is closer to the second side frame 52 than the relay coupling 82 in the retracted position is to the second side frame 52. The relay coupling 82 is coupled to the toner coupling 321 when the relay coupling 82 is in the advanced position in a state where the toner cartridge 2 is attached to the drum frame 50.

Each of the contacting members 83 is configured to contact the first side plate 401 of the main frame 4 when the drum cartridge 3 is attached to the main frame 4. Each of the contacting members 83 is movable in the first direction between the retracted position and the advanced position together with the corresponding unlocking member 81 and relay coupling 82. The contacting member 83 in the advanced position is closer to the second side frame 52 than the contacting member 83 in the retracted position is to the second side frame 52 in the first direction. Each of the contacting members 83 has a sloped surface 831. The sloped surface 831 is inclined relative to the second direction.

Each of the tension springs 84 is a resiliently member that urges the corresponding unlocking member 81, relay coupling 82, and contacting member 83 from the advanced positions toward the retracted positions. Each of the tension springs 84 has one end in the first direction connected to the first side frame 51, and another end in the first direction connected to the corresponding unlocking member 81. The tension spring 84 has a length in the first direction that can be changed between an expansion state and contraction state. The length of the tension spring 84 in the first direction in the expansion state is longer than that in the contraction state. Further, the length of the tension spring 84 in the first direction in the expansion state is longer than a natural length in the first direction of the tension spring 84. The unlocking member 81, the relay coupling 82, and the contacting member 83 are constantly urged from the advanced positions toward the retracted positions due to a resilient force of the corresponding tension spring 84.

The tension springs 84 are in their contraction states when the drum cartridge 3 is not attached to the main frame 4. Hence, the unlocking members 81, the relay couplings 82, and the contacting members 83 are in the retracted positions. In this case, each of the unlocking members 81 is positioned away from the locking members 38*a* and 38*b* of the corresponding toner cartridge 2 in the first direction. Specifically, the first pressure portion 811 is positioned away from the locking member 38*a* of the toner cartridge 2 in the first direction, and the second pressure portion 812 is positioned away from the locking member 38*b* of the toner cartridge 2 in the first direction. Further, the relay coupling 82 is positioned away from the toner coupling 321. At this time, the locking protrusions 381*a* and 381*b* of the toner cartridge 2 are in the locking position. Further, a driving force is not transmitted to the toner coupling 321.

A part of the contacting member 83 is brought into contact with an inner surface of the main frame 4 upon attachment of the drum cartridge 3 to which the toner cartridges 2 are attached to the main frame 4. Specifically, the sloped surface 831 of the contacting member 83 contacts the first side plate 401 such that the contacting member 83 moves from the retracted position to the advanced position, and the unlocking member 81 also moves together with the contacting member 83 from the retracted position to the advanced position.

Therefore, the first pressure portion 811 of the unlocking member 81 presses the locking protrusion 381*a* in the first direction, and the second pressure portion 812 of the unlocking member 81 presses the locking protrusion 381*b* in the first direction. As a result, the locking protrusions 381*a* and 381*b* move from the locking position to the unlocking position, thereby unlocking the movement of the shutter 16 by the locking members 38*a* and 38*b*.

At this time, the relay coupling 82 also moves together with the contacting member 83 from the retracted position to the advanced position. Through this movement, the relay coupling 82 is coupled to the toner coupling 321. Then, a driving force supplied from the image forming apparatus 1 causes the relay coupling 82 to rotate, thereby rotating the toner coupling 321.

According to the image forming apparatus 1 described above, the unlocking members 81, which are configured to press the locking members 38*a* and 38*b* of the toner cartridges 2, are provided at the drum cartridge 3, not at the main frame 4 of the image forming apparatus 1. Therefore, the unlocking members 81 can be accurately positioned relative to the locking members 38*a* and 38*b* of the corresponding toner cartridges 2 in comparison with a configuration in which the unlocking members 81 are provided at the main frame 4. Accordingly, each of the unlocking members 81 can press the corresponding locking members 38*a* and 38*b* with high accuracy.

Further, in the image forming apparatus 1, the unlocking members 81 move from the retracted positions to the advanced positions in accordance with an attachment operation of the drum cartridge 3 to the main frame 4. Hence, the unlocking members 81 can move from the retracted position to the advanced position without relying on a driving force supplied from a motor provided in the image forming apparatus 1.

Further, the unlocking members 81 are in their retracted positions in a state where the drum cartridge 3 is not attached to the main frame 4. Therefore, the unlocking members 81 do not hinder an attachment operation of the toner cartridges 2 to the drum frame 50.

Further, in the image forming apparatus 1, the relay couplings 82, which are configured to supply a driving force to the toner couplings 321 of the toner cartridges 2, are provided at the drum cartridge 3, not at the main frame 4 of the image forming apparatus 1. Therefore, accurate positioning of the relay couplings 82 relative to the toner couplings 321 of the corresponding toner cartridges 2 can be attained in comparison with a configuration in which the relay couplings 82 are provided at the main frame 4. Accordingly, the relay couplings 82 can be coupled to the corresponding toner couplings 321 with high accuracy.

Figure 19:
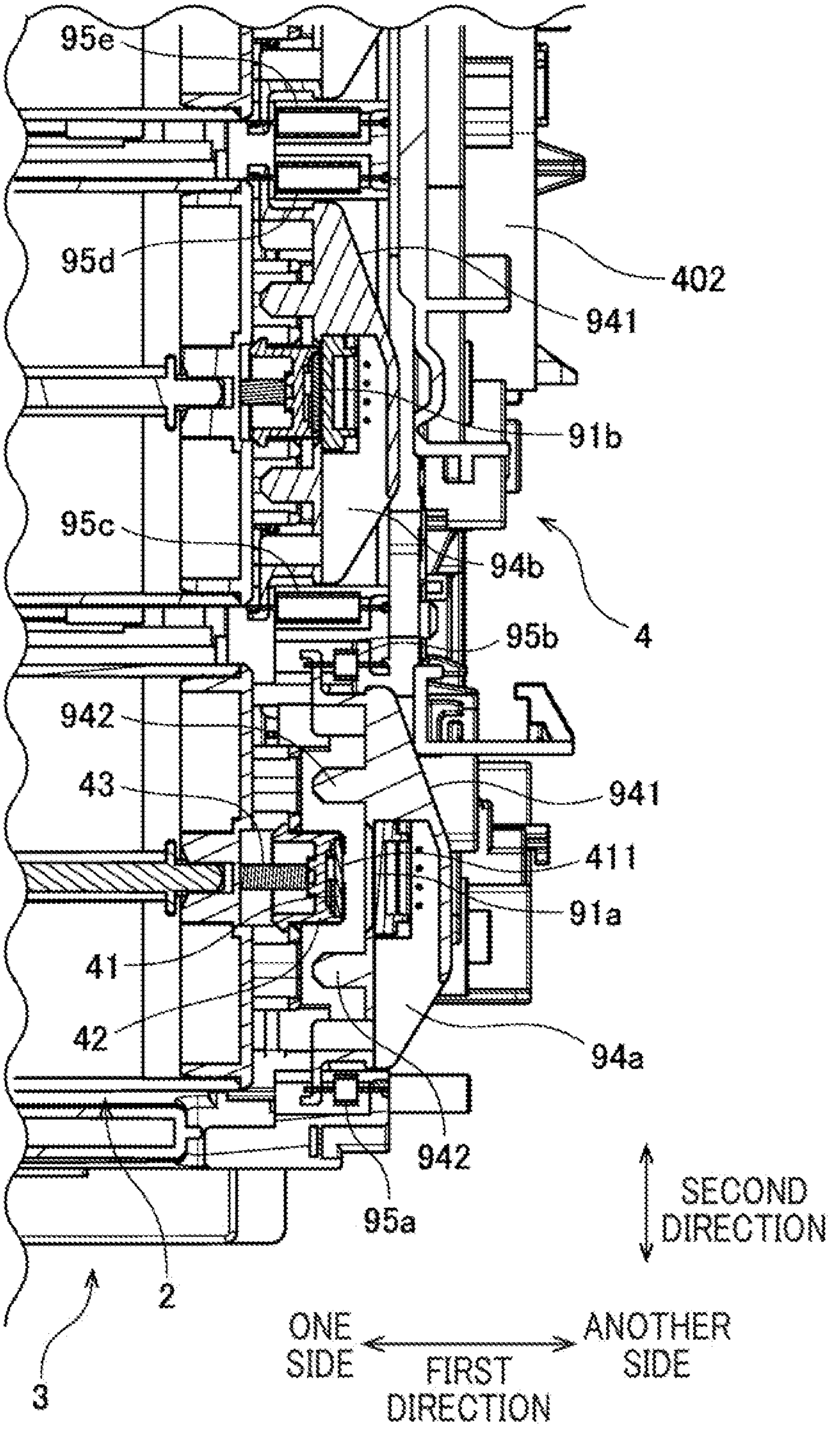
FIG. 19 is another partial cross-sectional view illustrating a state where the drum cartridge to which the toner cartridge is attached is in the process of being inserted into the main frame.

The wiring portion 90 is configured to electrically connect the IC chips 41 of the toner cartridges 2 and the main connector 403 provided in the main frame 4 to each other. FIG. 19 is a partial cross-sectional view of the image forming apparatus 1, and particularly illustrating a state where the drum cartridge 3 to which the toner cartridges 2 are attached is in the process of being inserted into the main frame 4. As illustrated in FIGS. 1 and 19, the wiring portion 90 includes the four drum contacts 91*a* to 91*d*, the drum harness 92, the drum connector 93, four contact holders 94*a* to 94*d*, and eight contact springs. Of the eight contact springs, five contact springs (i.e., first to fifth contact spring 95*a* to 95*e*) are illustrated in the drawings, while the illustration of the remaining three contact springs (i.e., sixth to eighth contact springs) are omitted.

The four drum contacts 91*a* to 91*d* are electrically connected to the drum connector 93 through the drum harness 92. The drum connector 93 is positioned at the third frame 53. The drum connector 93 is brought into contact with the main connector 403 when the drum cartridge 3 to which the toner cartridges 2 are attached is attached to the main frame 4. Thus, the drum connector 93 and the main connector 403 are electrically connected to each other.

The four drum contacts 91*a* to 91*d* are positioned at the second side frame 52, and arranged to be space apart from each other in the second direction. The drum contact 91*a* is held by the contact holder 94*a*. The drum contact 91*a* is positioned at a surface of the contact holder 94*a* that faces the first side frame 51. The drum contact 91*b* is held by the contact holder 94*b*. The drum contact 91*b* is positioned at a surface of the contact holder 94*b* that faces the first side frame 51. The drum contact 91*c* is held by the contact holder 94*c*. The drum contact 91*c* is positioned at a surface of the contact holder 94*c* that faces the first side frame 51. The drum contact 91*d* is held by the contact holder 94*d*. The drum contact 91*d* is positioned at a surface of the contact holder 94*d* that faces the first side frame 51.

The contact holder 94*a* has a sloped surface 941, and an opposite surface facing the first side frame 51. The sloped surface 941 is inclined relative to the second direction. The sloped surface 941 is brought into contact with the second side plate 402 of the main frame 4 when the drum cartridge 3 is attached to the main frame 4. The contact holder 94*a* includes two protrusions 942 protruding from the opposite surface toward the first side frame 51 in the first direction. Each of the contact holders 94*b* to 94*d* has the sloped surface 941 and the protrusions 942 the same as those of the contact holder 94*a*.

The drum contacts 91*a* to 91*d* and the contact holders 94*a* to 94*d* are movable in the first direction between a separated position and a contacting position. The drum contacts 91*a* to 91*d* in the contacting position are closer to the first side frame 51 than the drum contacts 91*a* to 91*d* in the separated position are to the first side frame 51 in the first direction. Further, the contact holders 94*a* to 94*d* in the contacting position are closer to the first side frame 51 than the contact holders 94_a_ to 94_d_ in the separated position are to the first side frame 51 in the first direction.

The first contact spring 95_a_ and the second contact spring 95_b_ are elastic members urging the drum contact 91_a_ and the contact holder 94_a_ from the contacting positions toward the separated positions. The third contact spring 95_c_ and the fourth contact spring 95_d_ are elastic members urging the drum contact 91_b_ and the contact holder 94_b_ from the contacting positions toward the separated positions. The fifth contact spring 95_e_ and the sixth contact spring are elastic members urging the drum contact 91_c_ and the contact holder 94_c_ from the contacting positions toward the separated positions. The seventh contact spring and the eighth contact spring are elastic members urging the drum contact 91_d_ and the contact holder 94_d_ from the contacting positions toward the separated positions. The first to fifth contact springs 95_a_ to 95_e_ and the sixth to eighth contact springs are examples of the "first elastic member".

Each of the first contact spring 95_a_ and the second contact spring 95_b_ has one end in the first direction connected to the contact holder 94_a_. Each of the third contact spring 95_c_ and the fourth contact spring 95_d_ has one end in the first direction connected to the contact holder 94_b_. Each of the fifth contact spring 95_e_ and the sixth contact spring has one end in the first direction connected to the contact holder 94_c_. Each of the seventh contact spring and the eighth contact spring has one end in the first direction connected to the contact holder 94_d_. Each of the eight contact springs (i.e., the first to fifth contact springs 95_a_ to 95_e_ and the sixth to eighth contact springs) further has another end in the first direction connected to the second side frame 52.

Each of the eight contact springs has a length in the first direction that can be changed between an expansion state and a contraction state. The length in the first direction of each of the eight contact springs in the expansion state is longer than that in the contraction state. Further, the length in the first direction of each of the eight contact springs in the expansion state is longer than a natural length of each of the eight contact springs.

The drum contact 91_a_ and the contact holder 94_a_ are constantly urged from the contacting position toward the separated position by the first contact spring 95_a_ and the second contact spring 95_b_. The drum contact 91_b_ and the contact holder 94_b_ are constantly urged from the contacting position toward the separated position by the third contact spring 95_c_ and the fourth contact spring 95_d_. The drum contact 91_c_ and the contact holder 94_c_ are constantly urged from the contacting position toward the separated position by the fifth contact spring 95_e_ and the sixth contact spring. The drum contact 91_d_ and the contact holder 94_d_ are constantly urged from the contacting position toward the separated position by the seventh contact spring and the eighth contact spring.

The eight contact springs are in the contraction states when the drum cartridge 3 is not attached to the main frame 4. Accordingly, the drum contacts 91_a_ to 91_d_, and the contact holders 94_a_ to 94_d_ are in the separated positions. In this case, the drum contacts 91_a_ to 91_d_ are positioned away from the electrical contact surfaces 411 of the IC chips 41 of the corresponding toner cartridges 2 in the first direction.

Parts of the contact holders 94_a_ to 94_d_ are brought into contact with the inner surface of the main frame 4 when the drum cartridge 3 to which the toner cartridges 2 are attached is attached to the main frame 4. Specifically, the sloped surfaces 941 of the contact holders 94_a_ to 94_d_ are brought into contact with the second side plate 402. Therefore, the contact holders 94_a_ to 94_d_ move from the separated positions to the contacting positions, and the drum contacts 91_a_ to 91_d_ also move from the separated positions to the contacting positions together with the contact holders 94_a_ to 94_d_. Accordingly, the drum contacts 91_a_ to 91_d_ are brought into contact with the electrical contact surfaces 411 of the IC chips 41 of the corresponding toner cartridges 2. Consequently, information stored in the IC chips 41 can be transmitted to the controller 5 through the drum contacts 91_a_ to 91_d_, the drum harness 92, the drum connector 93, the main connector 403, and the main harness 404. In other words, the drum contacts 91_a_ to 91_d_ relay transmission of information stored in the IC chips 41 in a state where the drum cartridge 3 to which the toner cartridges 2 are attached is attached to the main frame 4.

As illustrated in FIGS. 4 and 6, the toner cartridge 2 has two recessed portions 121. The recessed portions 121 are positioned at the second end portion 12 of the casing 10. Specifically, the recessed portions 121 are recessed in the first direction toward the first end portion 11 of the casing 10. The protrusions 942 of the contact holders 94_a_ to 94_d_ are inserted in the recessed portions 121 of the corresponding toner cartridge 2 as a result of the movement of the contact holders 94_a_ to 94_d_ from the separated positions to the contacting positions. This configuration can accurately position the contact holders 94_a_ to 94_d_ relative to the corresponding toner cartridges 2, thereby accurately positioning the drum contacts 91_a_ to 91_d_ relative to the electrical contact surfaces 411 of the IC chips 41.

In the image forming apparatus 1, the drum contacts 91_a_ to 91_d_ move in the first direction from the separated positions to the contacting positions in accordance with the attachment operation of the drum cartridge 3 to the main frame 4. Therefore, the drum contacts 91_a_ to 91_d_ can move from the separated positions to the contacting positions without relying on the driving force supplied from the motor of the image forming apparatus 1. Further, frictional wearing between the electrical contact surfaces 411 of the IC chips 41 and the drum contacts 91_a_ to 91_d_ when the toner cartridges 2 are attached to the drum cartridge 3 can be restrained.

Further, the drum contacts 91_a_ to 91_d_ and the contact holders 94_a_ to 94_d_ are in the separated positions when the drum cartridge 3 is not attached to the main frame 4. Therefore, the drum contacts 91_a_ to 91_d_ and the contact holders 94_a_ to 94_d_ do not obstruct the attachment operation of the toner cartridge 2 to the drum frame 50.

<4. Modifications>

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below.

<4-1. First Modification>

Figure 20:
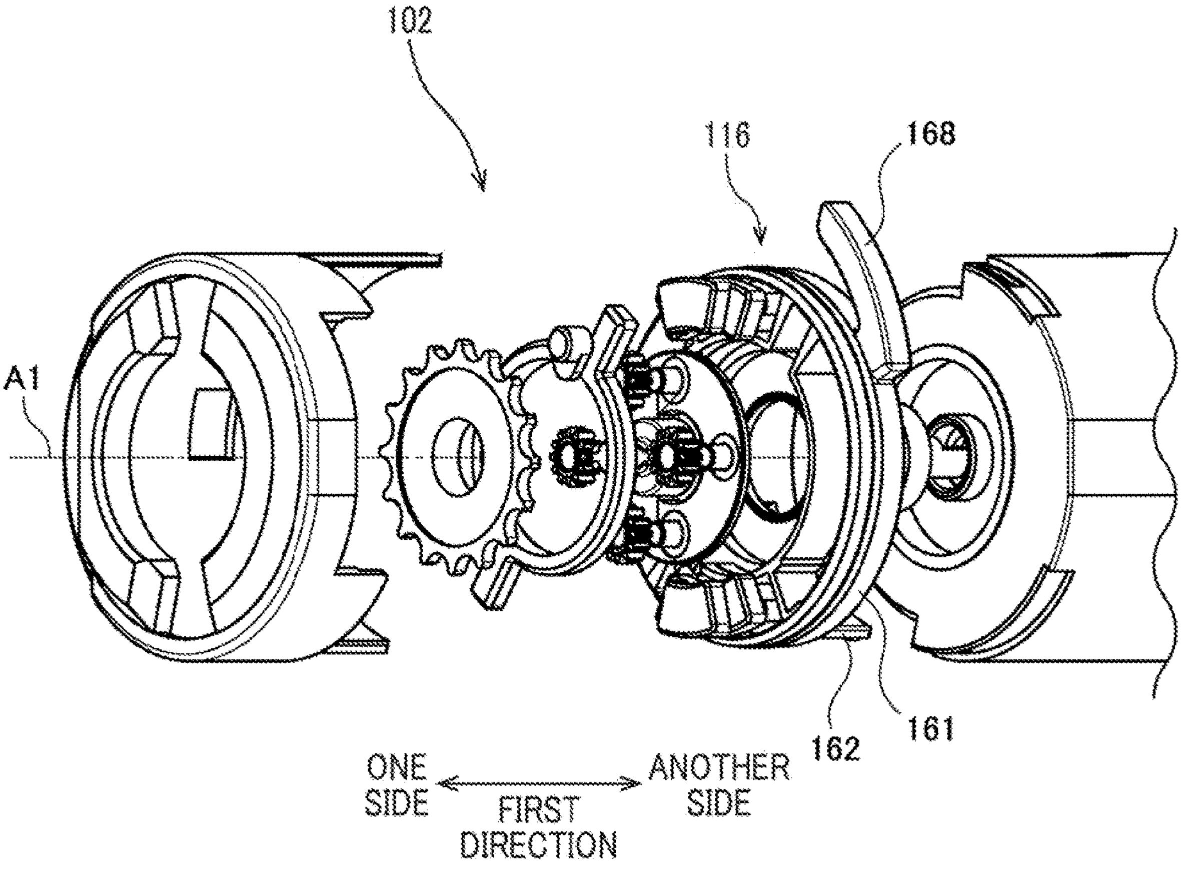
FIG. 20 is a partial exploded perspective view of a toner cartridge.

An image forming apparatus according to a first modification will be described with reference to FIGS. 20 through 22, wherein like parts and components are designated with the same reference numerals and duplicate description are omitted or simplified as appropriate. FIG. 20 is a partial exploded perspective view of a toner cartridge 102 according to the first modification. The toner cartridge 102 is different from the toner cartridge 2 according to the embodiment described above in that the toner cartridge 102 does not include the return springs 31*a* and 31*b*, and a shutter 116 of the toner cartridge 102 includes a lever 168. The lever 168 protrudes outward from an outer peripheral portion of the holder 161. Further, the lever 168 is positioned opposite to the shutter plate 162 relative to the first axis A1.

Figure 21:
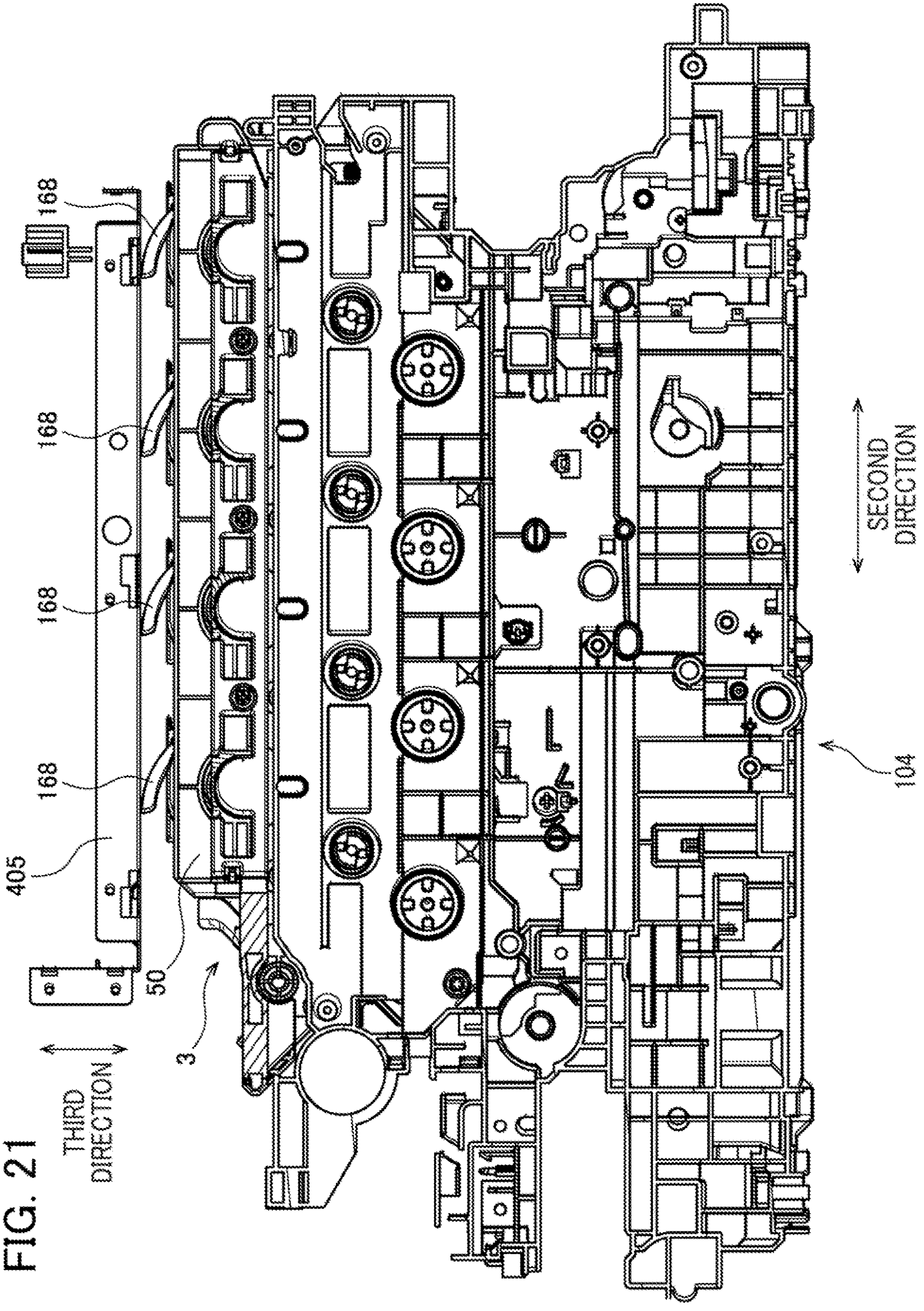
FIG. 21 is a view illustrating a state where the drum cartridge to which the toner cartridge is attached is attached to a main frame of an image forming apparatus.

FIG. 21 is a view illustrating a state where the drum cartridge 3 to which the toner cartridges 102 are attached is attached to a main frame 104 of the image forming apparatus according to the first modification. As illustrated in FIG. 21, the main frame 104 includes a third plate 405. The third plate 405 is positioned between the first side plate 401 and the second side plate 402 in the first direction. The third plate 405 faces the levers 168 of the toner cartridges 102 in the third direction in a state where the drum cartridge 3 to which the toner cartridges 102 are attached is attached to the main frame 104.

Figure 22:
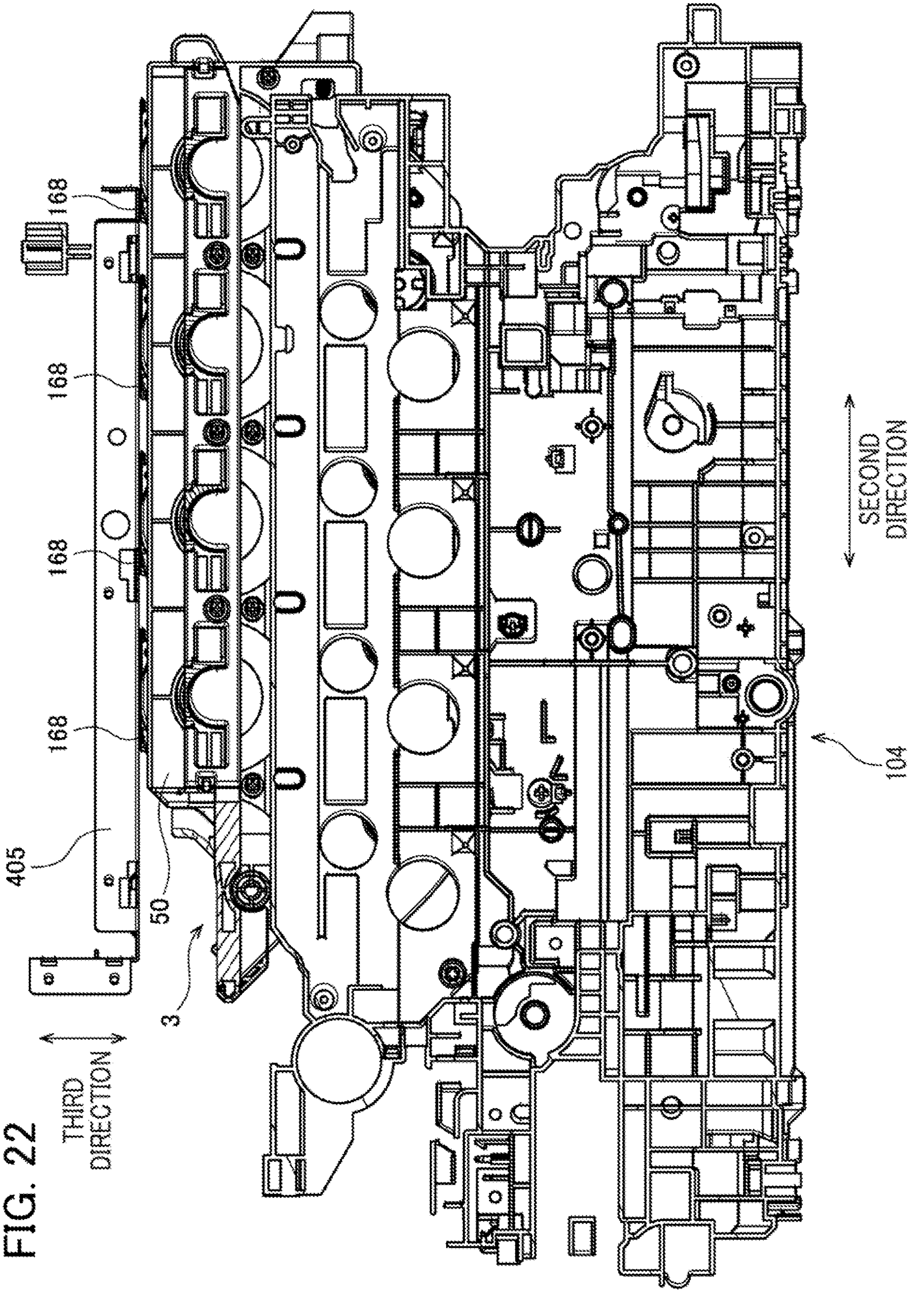
FIG. 22 is a view illustrating a state where the drum cartridge to which the toner cartridge is attached is in a process of being detached from the main frame.

FIG. 22 is a view illustrating a state where the drum cartridge 3 to which the toner cartridge 102 are attached is in a process of being detached from the main frame 104. When detaching the drum cartridge 3, the drum cartridge 3 first moves in the third direction toward the third plate 405 as illustrated in FIG. 22. At this time, the third plate 405 contacts the levers 168 such that the shutters 116 move from the open position to the closed position. As a result, the toner discharge openings 15 are closed with the shutter plates 162. Then, the drum cartridge 3 is pulled out in the second direction.

The above configuration can move the shutters 116 from the open positions to the closed positions in accordance with the detachment operation of the drum cartridge 3 from the main frame 104 without providing the return springs 31*a* and 31*b*. Accordingly, the number of parts and components in the toner cartridges 102 can be reduced.

<4-2. Second Modification>

In the embodiment described above, the return springs 31*a* and 31*b* are configured to move the shutter 16 from the open position to the closed position by making use of the resilient force that changes the length of the return springs 31*a* and 31*b* from the second state to the first state. In contrast, according to the second modification, the two return springs 31*a* and 31*b* may be configured to move the shutter 16 from the open position to the closed position by making use of the shrinking force that changes the return springs 31*a* and 31*b* from a third state in which the length of the return springs 31*a* and 31*b* are longer than the natural length to a fourth state in which the length of the return spring 31*a* and 31*b* are shorter than that in the third state.

<4-3. Third Modification>

In the embodiment described above, the toner cartridge 2 includes four planetary gears 33*a* to 33*d*. However, the number of planetary gears included in the toner cartridge 2 may be one to three, or may be five or more.

<4-4. Fourth Modification>

In the embodiment described above, four of the toner cartridges 2 are attachable to the single drum cartridge 3. However, the number of toner cartridges 2 attachable to the single drum cartridge 3 may be one to three, or may be five or more. Similarly, the number of developing rollers 60 included in the drum cartridge 3 may also be one to three, or may be five or more. Further, the number of photosensitive drums 70 included in the drum cartridge 3 may be one to three, or may be five or more. Further, the number of relay couplings 82 included in the drum cartridge 3 may be one to three, or may be five or more. Still further, the number of drum contacts 91*a* to 91*d* included in the drum cartridge 3 may be one to three, or may be five or more.

<4-5. Fifth Modification>

The toner couplings 321 and the relay couplings 82 may be gears.

<4-6. Sixth Modification>

The sun gear 351, the first to fourth planetary gears 33*a* to 33*d*, and the internal gear 34 include the plurality of gear teeth for transmitting a rotational force in the embodiment described above, but the present disclosure need not be limited to this configuration. For example, these components may transmit a rotational force through friction between friction members such as rubbers.

<4-7. Seventh Modification>

In the embodiment described above, each of the toner cartridges 2 includes the agitator 20 as a conveying member for conveying toner. Instead, an auger having a helical shape may be employed as the conveying member.

<4-8. Others>

The detailed shapes of the components constituting the image forming apparatus may be different from those illustrated in the drawings. Further, the parts and the components appearing in the embodiment and modifications described above may be employed or omitted as appropriate, as long as any contradiction is avoided.

What is claimed is:

1. A drum cartridge attachable to and detachable from a main frame of an image forming apparatus, the drum cartridge comprising:

a photosensitive drum rotatable about a drum axis extending in a first direction;

a drum frame including a first side frame positioned at one end portion in the first direction of the photosensitive drum and a second side frame positioned at another end portion in the first direction of the photosensitive drum, a toner cartridge including a storage medium having an electrical contact surface being attachable to and detachable from the drum frame; and a drum contact positioned at the second side frame, wherein, in a state where the toner cartridge is attached to the drum frame, the drum contact is movable in the first direction between:

a separated position in which the drum contact is positioned away from the electrical contact surface; and a contacting position in which the drum contact is in contact with the electrical contact surface, and wherein the drum contact moves from the separated position to the contacting position in accordance with attachment of the drum cartridge to the main frame.

2. The drum cartridge according to claim 1, wherein the drum contact relays transmission of information stored in the storage medium to the image forming apparatus in a state where the toner cartridge is attached to the drum frame and the drum cartridge is attached to the main frame.

3. The drum cartridge according to claim 2, wherein the drum frame further includes a third frame connecting the first side frame and the second side frame to each other, the drum cartridge further comprising:

a drum connector positioned at the third frame, the drum connector being configured to be electrically connected to a main connector provided at the main frame, the drum connector being in contact with the main connector in a state where the drum cartridge is attached to the main frame; and a harness electrically connecting the drum contact and the drum connector to each other.

4. The drum cartridge according to claim 1, wherein the drum cartridge is attachable to and detachable from the main frame in a second direction crossing the first direction, the drum cartridge further comprising another photosensitive drum rotatable about another drum axis extending in the first direction, the photosensitive drum and the another photosensitive drum being positioned to be spaced apart from each other in the second direction.

5. The drum cartridge according to claim 1, wherein the drum contact is in the separated position in a state where the drum cartridge is detached from the main frame.

6. The drum cartridge according to claim 1, further comprising a developing roller rotatable about a developing axis extending in the first direction.

7. The drum cartridge according to claim 6, wherein the developing roller is a magnetic roller.

8. The drum cartridge according to claim 1, further comprising an elastic member urging the drum contact from the contacting position toward the separated position.

9. The drum cartridge according to claim 1, further comprising a contact holder holding the drum contact, the contact holder being movable in the first direction together with the drum contact between the separated position and the contacting position, wherein the contact holder moves from the separated position to the contacting position in accordance with the attachment of the drum cartridge to the main frame in a state where the toner cartridge is attached to the drum frame.

10. The drum cartridge according to claim 9, wherein the contact holder makes contact with an inner surface of the main frame to move from the separated position to the contacting position during the attachment of the drum cartridge to the main frame.

11. The drum cartridge according to claim 9, wherein the contact holder includes a protrusion protruding in the first direction, wherein the toner cartridge has a recessed portion recessed in the first direction, and wherein the protrusion is inserted in the recessed portion in a state where the toner cartridge is attached to the drum frame and the drum cartridge is attached to the main frame.

12. The drum cartridge according to claim 1, wherein the toner cartridge further includes a casing configured to accommodate toner therein, and wherein the electrical contact surface is movable in the first direction relative to the casing.

13. The drum cartridge according to claim 12, wherein the toner cartridge further includes an elastic member positioned between the electrical contact surface and the casing, the elastic member of the toner cartridge pressing the electrical contact surface toward the drum contact in the first direction in a state where the toner cartridge is attached to the drum frame and the drum cartridge is attached to the main frame.

14. The drum cartridge according to claim 13, wherein the toner cartridge further includes a chip holder holding the electrical contact surface, the chip holder being movable in the first direction together with the electrical contact surface relative to the casing, and wherein the elastic member of the toner cartridge is positioned between the chip holder and the casing.

15. The drum cartridge according to claim 1, wherein the toner cartridge further includes:

a casing configured to accommodate toner therein, the casing having a toner supply opening;

a shutter movable between:

a closed position in which the shutter closes the toner supply opening; and an open position in which the shutter opens the toner supply opening; and a locking member positioned at one end portion in the first direction of the casing, the locking member being configured to lock a movement of the shutter, the drum cartridge further comprising an unlocking member positioned at the first side frame, the unlocking member being movable in the first direction between an advanced position and a retracted position, wherein, in a state where the toner cartridge is attached to the drum frame:

the unlocking member is positioned away from the locking member in the first direction when the unlocking member is in the retracted position; and the unlocking member presses the locking member in the first direction to cause the locking member to unlock the movement of the shutter when the unlocking member is in the advanced position.

16. The drum cartridge according to claim 15, wherein the unlocking member in the advanced position is positioned closer to the second side frame in the first direction than the unlocking member in the retracted position is to the second side frame.

17. The drum cartridge according to claim 1, wherein the drum contact in the contacting position is positioned closer to the first side frame in the first direction than the drum contact in the separated position is to the first side frame.

* * * * *